(12) United States Patent
Roh

(10) Patent No.: US 7,286,537 B2
(45) Date of Patent: Oct. 23, 2007

(54) INTERNET PROTOCOL ADDRESS ALLOCATION DEVICE AND METHOD

(75) Inventor: Eung-Seok Roh, Suwon-shi (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 957 days.

(21) Appl. No.: 10/650,925

(22) Filed: Aug. 29, 2003

(65) Prior Publication Data

US 2004/0052216 A1    Mar. 18, 2004

(30) Foreign Application Priority Data

Sep. 17, 2002    (KR)    ............... 10-2002-0056650

(51) Int. Cl.
*H04L 12/56* (2006.01)
*H04J 3/24* (2006.01)

(52) U.S. Cl. ............... 370/392; 370/401; 370/475

(58) Field of Classification Search ............... None
See application file for complete search history.

(56) References Cited

U.S. PATENT DOCUMENTS

| | | | |
|---|---|---|---|
| 6,157,950 A | 12/2000 | Krishnan | |
| 6,249,820 B1 | 6/2001 | Dobbins et al. | |
| 6,353,614 B1 | 3/2002 | Borella et al. | |
| 6,381,638 B1 | 4/2002 | Mahler et al. | |
| 7,106,739 B2 * | 9/2006 | Beier | 370/392 |
| 7,139,828 B2 * | 11/2006 | Alkhatib et al. | 709/230 |
| 7,154,891 B1 * | 12/2006 | Callon | 370/392 |
| 7,197,035 B2 * | 3/2007 | Asano | 370/392 |
| 2003/0007486 A1 * | 1/2003 | March et al. | 370/389 |

OTHER PUBLICATIONS

Network Working Group Request for Comments 1631, entitled *The IP Network Address Translator(NAT)* by K. Egevang et al. dated May 1994.
Network Working Group Request for Comments 2131, entitled *Dynamic Host Configuration Protocol*, by R. Droms dated Mar. 1997.
Network Working Group Request for Comments 2132, entitled *DHCP Options and Bootp Vendor Extensions* by S. Alexander et al. dated Mar. 1997.

* cited by examiner

*Primary Examiner*—Hassan Kizou
*Assistant Examiner*—Brian Roberts
(74) *Attorney, Agent, or Firm*—Robert E. Bushnell, Esq.

(57) ABSTRACT

A device and method for allocating the same Internet protocol (IP) address to all information terminals or hosts connected to a specific local network, which allows the hosts in the local network to gain access to the Internet while the hosts share a single IP address. The device includes a dynamic host configuration protocol (DHCP) client, a local access point, and a DHCP server spoofer. The DHCP client is allocated an IP address through a DHCP message communication with an Internet service provider. The Internet service provider includes a DHCP server for allocating IP addresses to the hosts and an Internet access gateway. The local access point includes a hardware address port translation (HAPT) module and a local IP address translation (LIAT) module. The HAPT module modifies a source medium access control (MAC) address and port number of a frame received from each host, stores the modified result in a HAPT table, and recovers a destination MAC address and port number of a frame received from the Internet service provider, referring to the HAPT table. The LIAT module prevents a collision occurring because the hosts have the same public IP address. The DHCP server spoofer implements a DHCP server function to allocate an IP address to each host.

20 Claims, 23 Drawing Sheets

CLASS B

SUBNET MASK
:255.255.255.248
AND
IP ADDRESS:165.213.85.58
‖
SUBNET ADDRESS:165.213.85.56

1700

| NETWORK ID (16BIT) | SUBNET ID (13BIT) | HOST ID (3BIT) |
|---|---|---|
| 11111111 11111111 | 11111111 11111 | 000 |
| 10100101 11010101 | 01010101 00111 | 010 |
| 10100101 11010101 | 01010101 00111 | 000 |

IP ADDRESSES AVAILABLE FOR DIFFERENTIATING HOSTS STORED IN ARP CACHE TABLE OF CM

| | | | |
|---|---|---|---|
| 165.213.85.57 : | 10100101 11010101 | 01010101 00111 | 001 |
| 165.213.85.58 : | 10100101 11010101 | 01010101 00111 | 010 |
| 165.213.85.59 : | 10100101 11010101 | 01010101 00111 | 011 |
| 165.213.85.60 : | 10100101 11010101 | 01010101 00111 | 100 |
| 165.213.85.61 : | 10100101 11010101 | 01010101 00111 | 101 |
| 165.213.85.62 : | 10100101 11010101 | 01010101 00111 | 110 |

INTERNET PROTOCOL ADDRESS ALLOCATION DEVICE AND METHOD

CLAIM OF PRIORITY

This application claims priority to an application entitled "IP address allocation device and method", filed in the Korean Industrial Property Office on Sep. 17, 2002 and assigned Serial No. 2002-56650, the contents of which are hereby incorporated by reference.

BACKGROUND OF THE INVENTION

1. Technical Field

The present invention relates to a device and method for allocating an Internet protocol (IP) address in a network, and more particularly to a device and method for allocating the same Internet protocol (IP) address to all information terminals connected to a specific local network.

2. Related Art

In order for information terminals to gain access to the Internet, when the information terminals are connected to a local network established in a home or office, it is necessary to assign a distinguishable Internet protocol (IP) address to each of the information terminals. The information terminals can also be referred to as hosts. Thus, in order for a predetermined number of hosts to gain access to the Internet, it is necessary to allocate the same number of However, it is can be difficult to allocate a large number of public Internet protocol (IP) addresses due to Internet protocol (IP) address depletion. As more and more hosts are connected to telephone lines, cable modems, wireless networks and other devices and networks in order to have access to the Internet, with each one of the hosts having its own Internet protocol address, the number of available Internet protocol addresses is becoming reduced.

One method to overcome such a problem is for a plurality of hosts to share a single Internet protocol (IP) address using network address translation (NAT). However, sometimes network address translation (NAT) can result in faulty operation of a system or can result in directing a packet to a wrong place.

Exemplars of recent efforts related to Internet protocol addresses are disclosed, for example, in U.S. Pat. No. 6,381,638 to Mahler et al., entitled SYSTEM AND METHOD FOR OPTIONS BASED ADDRESS REUSE, issued on Apr. 30, 2002, U.S. Pat. No. 6,249,820 to Dobbins et al., entitled INTERNET PROTOCOL (IP) WORK GROUP ROUTING, issued on Jun. 19, 2001; U.S. Pat. No. 6,157,950 to Krishnan, entitled METHODS AND APPARATUS FOR INTERFACING A COMPUTER OR SMALL NETWORK TO A WIDE AREA NETWORK SUCH AS THE INTERNET, issued on Dec. 5, 2000, and U.S. Pat. No. 6,353,614 to Borella et al., entitled METHOD AND PROTOCOL FOR DISTRIBUTED NETWORK ADDRESS TRANSLATION, issued on Mar. 5, 2002, Network Working Group Request for Comments 1631, entitled THE IP NETWORK ADDRESS TRANSLATOR (NAT) by K. Egevang et al. dated May 1994, Network Working Group Request for Comments 2131, entitled DYNAMIC HOST CONFIGURATION PROTOCOL, by R. Droms dated March 1997, and Network Working Group Request for Comments 2132, entitled DHCP OPTIONS AND BOOTP VENDOR EXTENSIONS by S. Alexander et al. dated March 1997.

While these efforts contain significance, it is my observation that further improvements can also be contemplated.

SUMMARY OF THE INVENTION

Therefore, the present invention has been made in view of the above concerns. The present invention provides a device and method for allocating an Internet protocol (IP) address which allows a plurality of hosts in a local network established for accessing the Internet to gain access to the Internet while the hosts share a single Internet protocol (IP) address.

The present invention also provides a device and method for allocating an Internet protocol (IP) address which allows a plurality of hosts to share a single Internet protocol (IP) address without using the network address translation (NAT).

The present invention additionally provides a device for allocating Internet protocol (IP) addresses in a local network including at least two hosts and an Internet access gateway connected to the hosts, in which the hosts can gain access to the Internet while using the same public Internet protocol (IP) address, the device comprising: a dynamic host configuration protocol (DHCP) client which is allocated an Internet protocol (IP) address through a dynamic host configuration protocol (DHCP) message communication with an Internet service provider, the Internet service provider including a dynamic host configuration protocol (DHCP) server for allocating Internet protocol (IP) addresses to the hosts and the Internet access gateway requesting an Internet protocol (IP) address allocation; a local access point including a hardware address port translation (HAPT) module and a local IP address translation (LIAT) module, said hardware address port translation (HAPT) module operating to modify a source medium access control (MAC) address and port number of a frame received from each of the hosts, store the modified result in a hardware address port translation (HAPT) table, and recover a destination medium access control (MAC) address and port number of a frame received from the Internet service provider with reference to the hardware address port translation (HAPT) table, said local IP address translation (LIAT) module operating to prevent a collision occurring because that the hosts have the same public Internet protocol (IP) address; and a dynamic host configuration protocol (DHCP) server spoofer for implementing a dynamic host configuration protocol (DHCP) server function so as to allocate an Internet protocol (IP) address to each of the hosts.

In accordance with the principles of the present invention, as embodied and broadly described, the present invention provides an apparatus allocating addresses, the apparatus comprising: a network device being connected to a service provider and being connected to at least two hosts, the at least two hosts including a first host, the service provider allocating a first protocol address to the first host, the first protocol address being included in frames sent from one of the at least two hosts, said network device comprising: a first module receiving frames from the hosts, modifying source medium access control addresses and port numbers of the frames received from the hosts, and forwarding the frames having the modified source addresses and port numbers to the service provider; said first module storing the modified source medium access control addresses and port numbers in a first table; said first module receiving frames from the service provider, accessing the first table, modifying destination medium access control addresses and port numbers of the frames received from the service provider in dependence upon the addresses and port numbers stored in the first table, and forwarding the frames having the modified destination addresses and port numbers to the hosts corresponding to the modified destination addresses and port numbers; and a server spoofer transmitting and assigning the first protocol address to all of the hosts other than the first host.

In accordance with the principles of the present invention, as embodied and broadly described, the present invention provides a method for allocating Internet protocol addresses in a local network, the method comprising: allocating a first Internet protocol address to an Internet access gateway when the Internet access gateway is booted; requesting a second Internet protocol address, said requesting being performed by a first host selected from among at least two hosts connected to the Internet access gateway; allocating the second Internet protocol address to the first host in response to said requesting, the local network including the Internet access gateway connected to an Internet service provider and to the at least two hosts, each of the at least two hosts using the second Internet protocol address to access the Internet through the Internet service provider; said allocating of the second protocol address to the first host and said allocating of the first Internet protocol address being performed by a dynamic host configuration protocol server included in the Internet service provider; capturing network configuration information including the second Internet protocol address, the network configuration information being transmitted from the dynamic host configuration protocol server to the first host when the second Internet protocol address is allocated to the first host; storing the captured information in a dynamic host configuration protocol server spoofer included in the Internet access gateway; and allocating the second Internet protocol address to the hosts other than the first host.

In accordance with the principles of the present invention, as embodied and broadly described, the present invention provides a method of allocating addresses, the method comprising: allocating a first protocol address to a first host selected from among at least two hosts in a network, the at least two hosts being connected to a network device, the network device being connected to a service provider, said allocating of the first protocol address being performed by the service provider, the first protocol address corresponding to a source Internet protocol address in frames sent from every one of the at least two hosts to the service provider for access to the Internet; transmitting and assigning the first protocol address to all of the hosts other than the first host; receiving frames from the hosts; modifying source medium access control addresses and port numbers of the frames received from the hosts; forwarding the frames having the modified source addresses and port numbers to the service provider; storing the modified source medium access control addresses and port numbers in a first table; receiving frames from the service provider; accessing the first table; modifying destination medium access control addresses and port numbers of the frames received from the service provider in dependence upon the addresses and port numbers stored in the first table; and forwarding the frames having the modified destination addresses and port numbers to the hosts corresponding to the modified destination addresses and port numbers.

The present invention is more specifically described in the following paragraphs by reference to the drawings attached only by way of example. Other advantages and features will become apparent from the following description and from the claims.

BRIEF DESCRIPTION OF THE DRAWINGS

In the accompanying drawings, which are incorporated in and constitute a part of this specification, embodiments of the invention are illustrated, which, together with a general description of the invention given above, and the detailed description given below, serve to exemplify the principles of this invention.

FIG. 17 is a view showing the list of configurable Internet protocol (IP) addresses for illustrating the procedure of generating subnet addresses, in accordance with the principles of the present invention;

DESCRIPTION OF BEST MODE OF CARRYING OUT THE INVENTION

Figure 1:
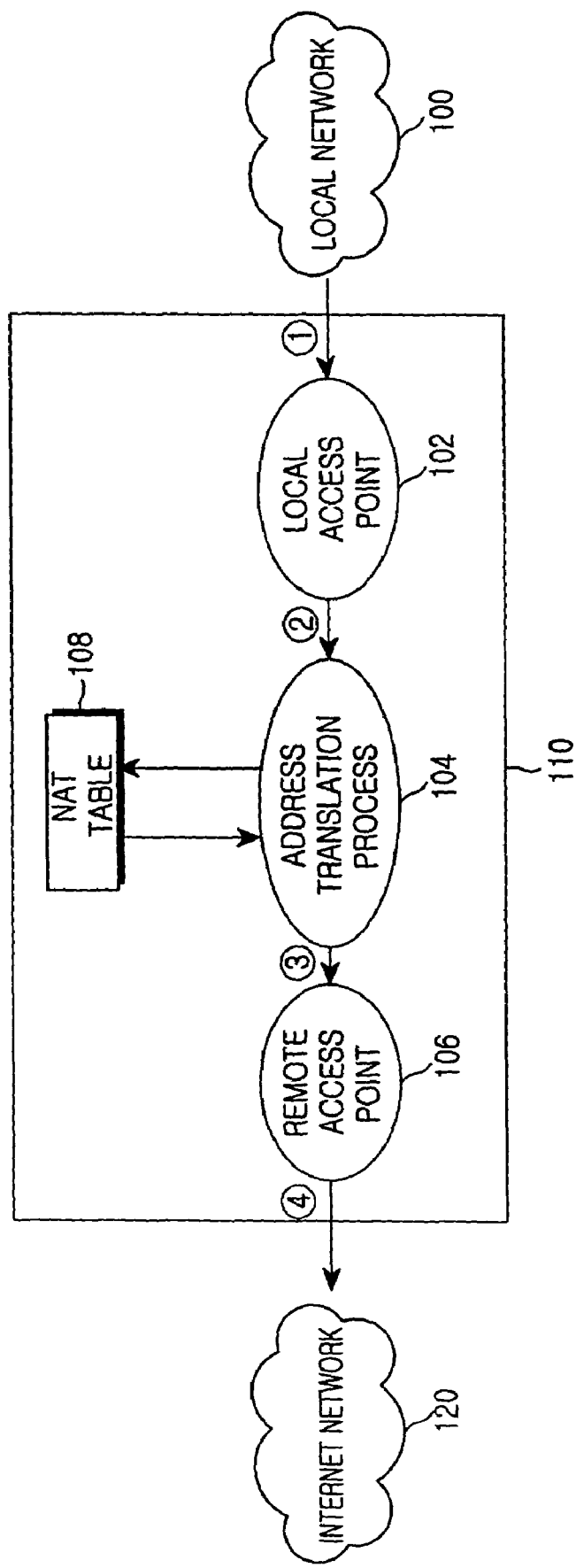
FIG. 1 is a view showing the procedure of transmitting a frame from the local network using network address translation (NAT)

While the present invention will be described more fully hereinafter with reference to the accompanying drawings, in which details of the present invention are shown, it is to be understood at the outset of the description which follows that persons of skill in the appropriate arts may modify the invention here described while still achieving the favorable results of this invention. Accordingly, the description of the best mode contemplated of carrying out the invention, which follows, is to be understood as being a broad, teaching disclosure directed to persons of skill in the appropriate arts, and not as limiting upon the present invention.

Illustrative embodiments of the best mode of carrying out the invention are described below. In the interest of clarity, not all features of an actual implementation are described. In the following description, well-known functions, constructions, and configurations are not described in detail since they could obscure the invention with unnecessary detail. It will be appreciated that in the development of any actual embodiment numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill having the benefit of this disclosure.

In order for information terminals to gain access to the Internet, when the information terminals are connected to a local network established in a home or office, it is necessary to assign a distinguishable Internet protocol (IP) address to each of the information terminals. The information terminals can also be referred to as hosts. Thus, in order for a predetermined number of hosts to gain access to the Internet, it is necessary to allocate the same number of Internet protocol (IP) addresses.

However, it is can be difficult to allocate a large number of public Internet protocol (IP) addresses due to Internet protocol (IP) address depletion. As more and more hosts are connected to telephone lines, cable modems, wireless networks and other devices and networks in order to have access to the Internet, with each one of the hosts having its own Internet protocol (IP) address, the number of available Internet protocol (IP) addresses is becoming reduced.

One method to overcome such a problem is for a plurality of hosts to share a single Internet protocol (IP) address using network address translation (NAT). However, sometimes network address translation (NAT) can result in faulty operation of a system or can result in directing a packet to a wrong place.

Network address translation (NAT) is used to translate an Internet protocol (IP) address in a private network to a public Internet protocol (IP) address, thereby gaining access to the Internet. The network address translation is a technology used in a device at the border between the public Internet network and the private network for intermediating between them, and, in more detail, the network address translation translates a private Internet protocol (IP) address and port number to a public Internet protocol (IP) address and port number in real time, thereby enabling the use of general Internet services.

A method for using the network address translation (NAT) is described as follows. The following description will be given with reference to a cable network, in order to facilitate the discussion. When a single Internet protocol (IP) address is commonly used using the network address translation, a host connected to a local network uses a private Internet protocol (IP) address, and customer premises equipment (CPE) or carrier leased equipment (CLE) for connecting the local network to the Internet converts the private Internet protocol (IP) address to an allocated public Internet protocol (IP) address. Paths of Internet protocol (IP) packets are differentiated from each other by allocating a different port number field in the Internet protocol (IP) packet field for each of the hosts. The network address translation performs an Internet II protocol (IP) address translation with reference to a network address translation table.

For example, let us presume that a public Internet protocol (IP) address allocated to the customer premises equipment (CPE) is 211.198.1.1, and private Internet protocol (IP) addresses allocated to the hosts are 10.0.0.1 to 10.0.0.9. It is also assumed that 9 medium access control (MAC) addresses of 0000F0111101 to 0000F011109 are assigned to 9 hosts in the local network as shown in a network address translation table of Table 1. It is further assumed that an Ethernet medium access control (MAC) address of the cable modem (CM) is 0000F0000001, and a host on the Internet network, whose Internet protocol (IP) address is 108.100.1.7, has an Ethernet medium access control (MAC) address of 009027CCD033.

The following Table 1 is an example of the network address translation (NAT) table.

TABLE 1

| Public IP Address | Public Port Number | Private IP Address | Local Port Number | MAC Address |
|---|---|---|---|---|
| 211.198.1.1 | 0x1000 | 10.0.0.1 | 0x100c | 0000F0 111101 |
| 211.198.1.1 | 0x2000 | 10.0.0.2 | 0x100c | 0000F0 111102 |
| . | . | . | . | . |
| . | . | . | . | . |
| . | . | . | . | . |
| 211.198.1.1 | 0x9000 | 10.0.0.9 | 0x300a | 0000F0 111109 |

FIG. 1 is a view showing the procedure of transmitting a frame from the local network using network address translation (NAT). Generally, an entire network includes the local network 100, an Internet service provider 110, and the Internet network 120. In consideration of the cable network, the Internet service provider 110 is regarded as a cable modem termination process (CMTS). The frame from the local network 100 is transmitted to the Internet network 120 through a local access point 102, an address translation process 104, and a remote access point 106. The address translation process 104 performs an address translation of the frame received from the local network 100 with reference to the network address translation (NAT) table 108. As mentioned above, Table 1 shows an example of the network address translation (NAT) table 108.

Figure 2:
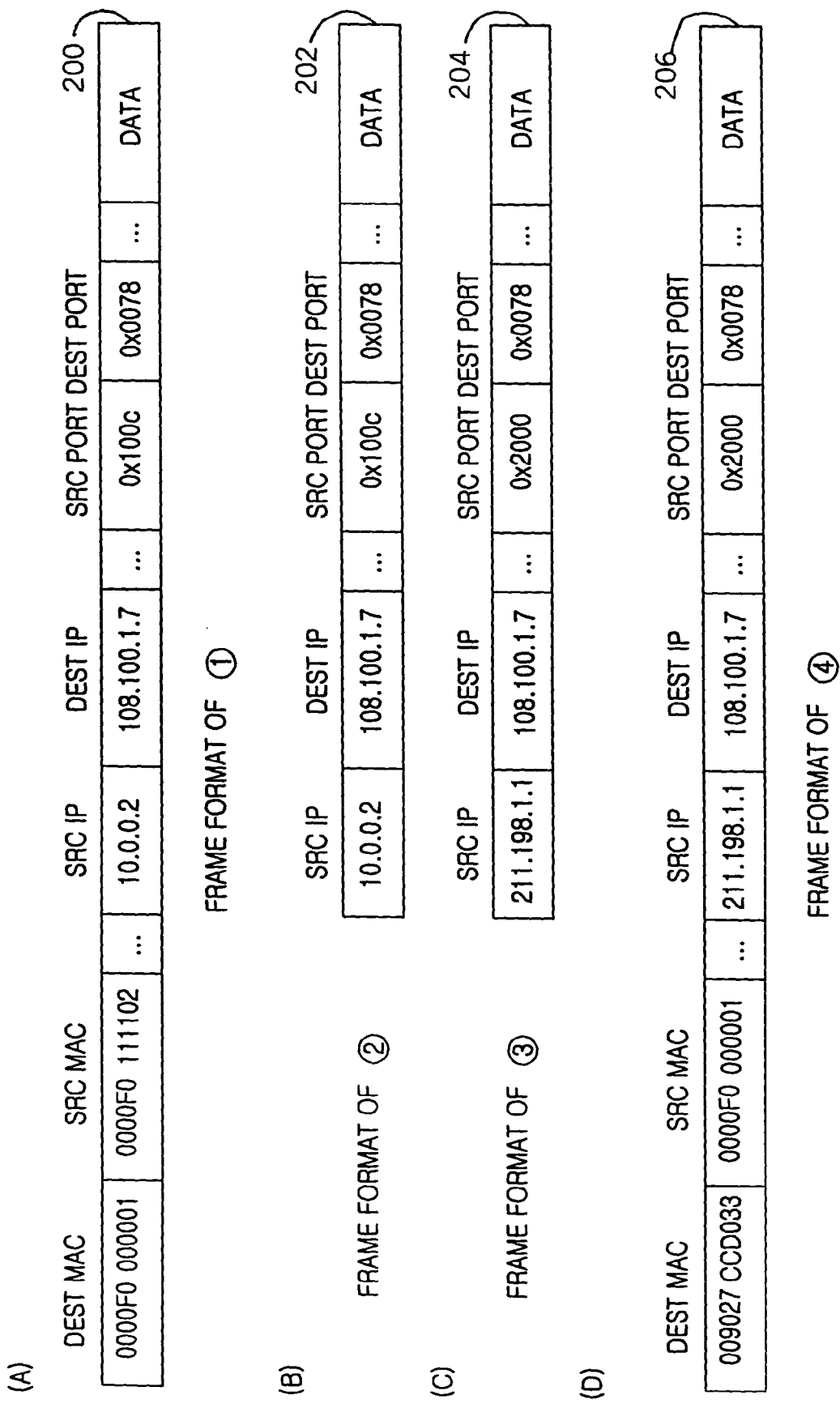
FIGS. 2a to 2d are views showing the structure of a frame transmitted from the local network to the Internet network at each of the transmission stages of the frame as shown in FIG. 1.

FIGS. 2a to 2d are views showing the structure of a frame transmitted from the local network to the Internet network at each of the transmission stages of the frame as shown in FIG. 1. In more detail, the FIG. 2a shows the structure of the frame 200 or packet 200 while being transmitted in procedure ① from the local network 100 to the local access point 102, as shown in FIG. 1. The FIG. 2b shows the structure of the frame 202 while being transmitted in procedure ② from the local access point 102 to the address translation process 104, as shown in FIG. 1. The FIG. 2c shows the structure of the frame 204 while being transmitted in procedure ③ from the address translation process 104 to the remote access point 106, as shown in FIG. 1. The FIG. 2d shows the structure of the frame 206 while being transmitted in procedure ④ from the remote access point 106 to the Internet network 120, as shown in FIG. 1. Referring to the frame structures shown in FIGS. 2a to 2d, the local access point 102 functions to remove destination (Dest) MAC and source (SRC) MAC fields from the frame. The address translation process 104 performs a translation of an SRC IP field and an SRC port of the frame. The remote access point 106 adds Dest MAC and SRC MAC fields to the translated frame.

Figure 3:
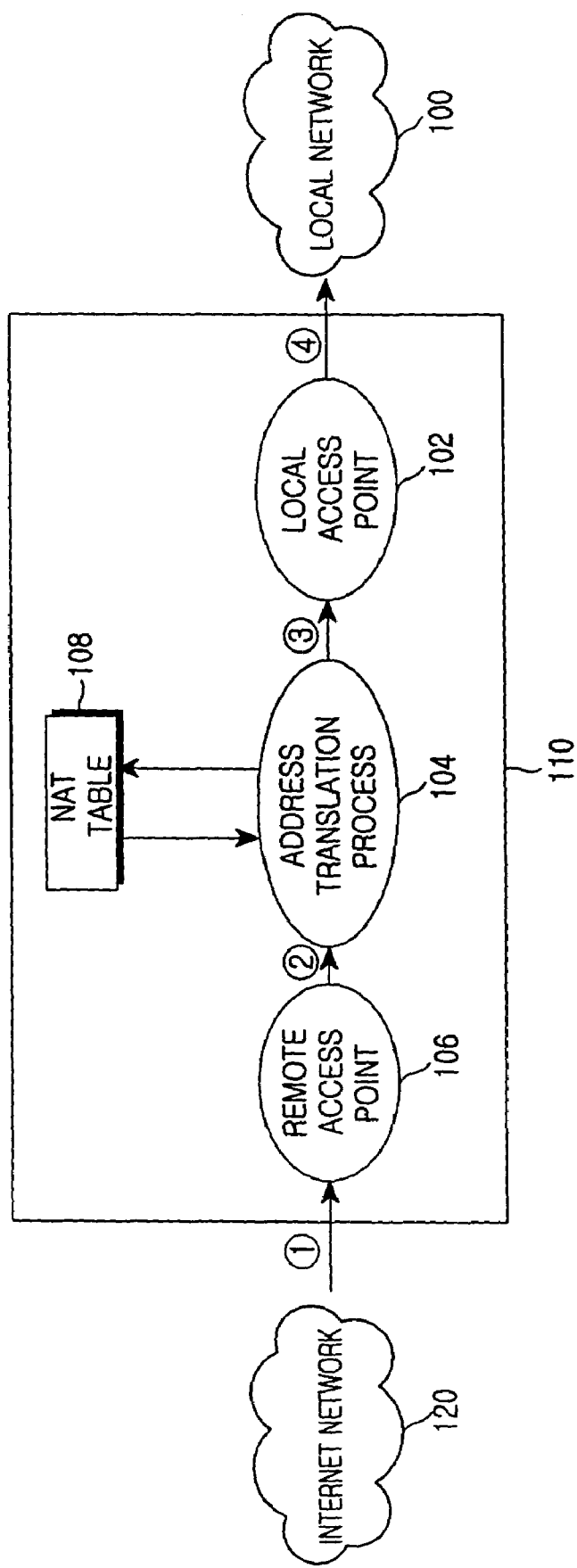
FIG. 3 is a view showing the procedure of transmitting a frame received from the Internet network to the local network using network address translation (NAT)
Figure 4:
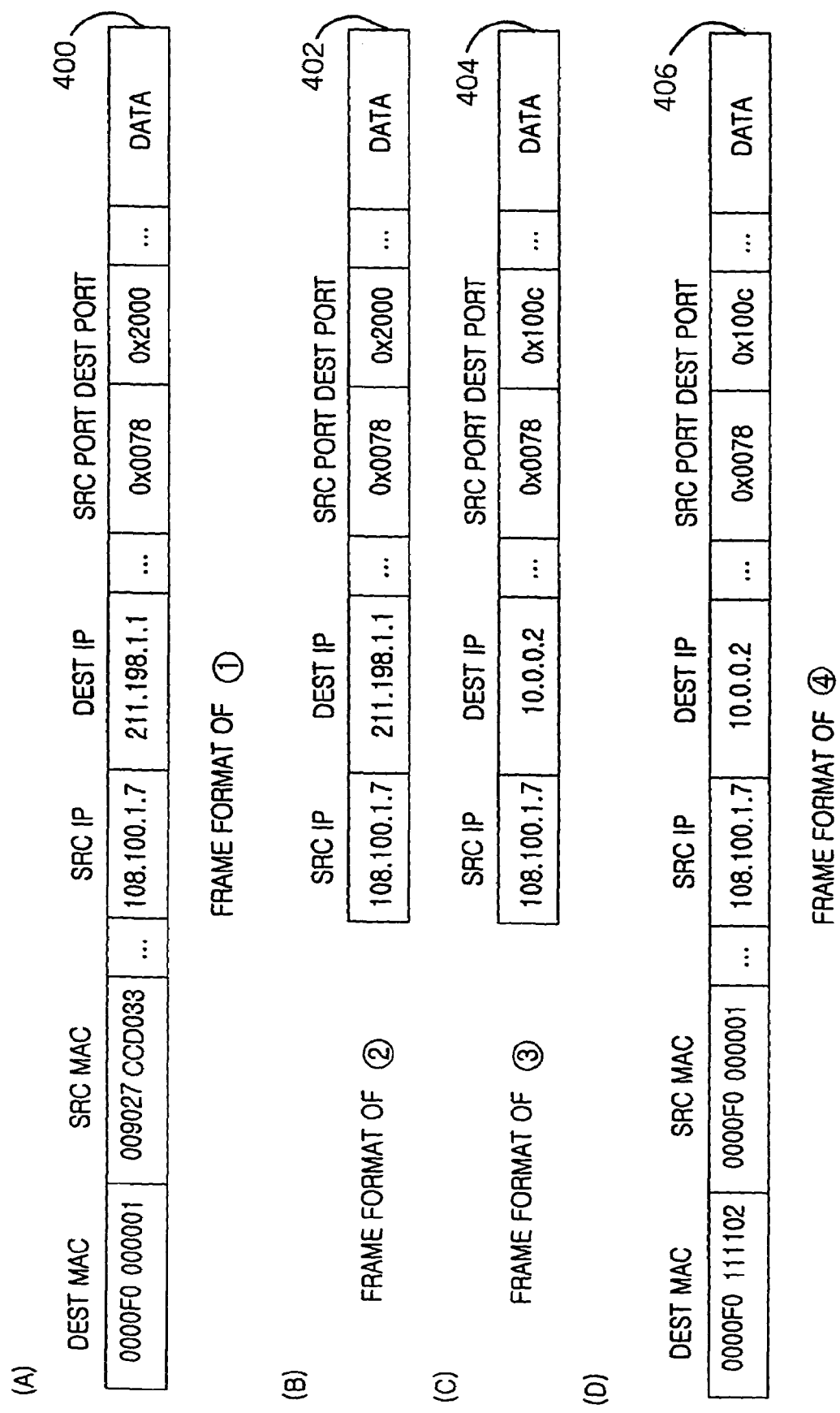
FIGS. 4a to 4d are views showing the structure of a frame transmitted from the Internet network to the local network at each of the transmission stages of the frame as shown in FIG. 3.

FIG. 3 is a view showing the procedure of transmitting a frame received from the Internet network to the local network using network address translation (NAT). FIG. 3 shows procedures ①, ②, ③, and ④. The data of frame 400 or packet 400 received from the Internet network 120 is transmitted to the local network 100 through a procedure basically opposite to that shown in FIG. 1. FIGS. 4a to 4d are views showing the structures 400, 402, 404, and 406 of frames transmitted from the Internet network to the local network at each of the transmission stages of the frame as shown in FIG. 3. The FIGS. 4a-4d are views showing the structures 400, 402, 404, and 406 of frames transmitted from the Internet network 120 to the local network at the stages shown in FIG. 3. The procedure shown in FIG. 3 is the opposite of that shown in FIG. 1. Similarly, the arrangement of the frame formats shown in FIGS. 4a-4d are the opposite of those shown in FIGS. 2a-2d. For example, frame format structure 200 (corresponding to procedure ① in FIGS. 1 and 2a) shows DEST MAC 0000F0 000001 and SRC MAC 0000F0 111102, while frame format structure 406 (corresponding to procedure ④ in FIGS. 3 and 4d) shows DEST MAC 0000F0 111102 and SRC MAC 0000F0 000001. The details of the frames shown in FIGS. 4a to 4d are believed to be self-explanatory in view of the foregoing, and thus a detailed description on the frames shown in these figures is omitted.

The NAT-based system as mentioned above has problems due to limitations in using the network address translation (NAT) as set forth in the Request for Comments (RFC) 1631. Such problems of using the network address translation (NAT) are as follows. Firstly, as the network address translation (NAT) tables become larger, the performance is lowered. Secondly, when network address translation (NAT) tables are used, the probability of mis-addressing is increased. Thirdly, use of network address translation (NAT) is not allowed with certain applications. Fourthly, when network address translation (NAT) tables are used, it can hide the identity of hosts. While this has the benefit of privacy, it also has generally a negative effect. Fifthly, there can be related problems with simple network management protocol (SNMP) and domain name server/service (DNS). Particularly, when the network address translation (NAT) is used to translate the private Internet protocol (IP) address to the public Internet protocol (IP) address, a position where Internet protocol (IP) address information is inserted is not standardized according to application systems, thereby causing such a problem that Internet protocol (IP) address information is copied even into the data region of a packet. That is, referring to FIGS. 2 and 4, it is possible to translate the Internet protocol (IP) address or port number, but the Internet protocol (IP) address included in the data field maintains the private Internet protocol (IP) address as it was; in result, causing a faulty operation of the system or directing the packet to a wrong place. In this case, the head field of the Internet protocol (IP) packet is translated by the network address translation (NAT), but the Internet protocol (IP) address in the data field is not translated. Thus, use of the network address translation (NAT) has a problem that some application systems are not operated. One may consider an improved network address translation (NAT) scheme which searches the data field of every packet to find a private Internet protocol (IP) address included in the data field, and translates the found private Internet protocol (IP) address. However, this improvement will lower the performance.

The principles of the present invention will now be described in detail with reference to the annexed FIGS. 5-27. The present invention provides a method which allows a plurality of hosts to gain access to the Internet while the hosts share a single Internet protocol (IP) address, and thus provides a single public network between an Internet service provider and the hosts. The Internet service provider corresponds to a cable modem termination process (CMTS) in a cable network. Such a method according to the present invention allows a plurality of hosts to share a single Internet protocol (IP) address without using the network address translation (NAT) which has been used for performing an address translation between different networks.

In the following description of the principles of the present invention, in order to provide a single public network between a cable modem termination process (CMTS) and hosts, a cable modem uses a dynamic host configuration protocol (DHCP) server spoofer. Here, the cable modem can correspond to an "Internet access gateway" in a network. The dynamic host configuration protocol (DHCP) server spoofer provides the same network configuration information to each of the hosts. Accordingly, all hosts then have the same Internet protocol (IP) address as the public Internet protocol (IP) address assigned by the cable modem termination process (CMTS). The cable modem functions as a bridge when Internet protocol (IP) packets are transmitted between the cable modem termination process (CMTS) and the hosts, and further includes a hardware address port translation (HAPT) module which functions to differentiate the Internet protocol (IP) packet of each of the hosts. It is preferable that the cable modem further includes a local IP address translation (LIAT) module which has a local IP address translation (LIAT) function to prevent an Internet protocol (IP) address collision between the hosts connected to the cable modem.

Figure 5:
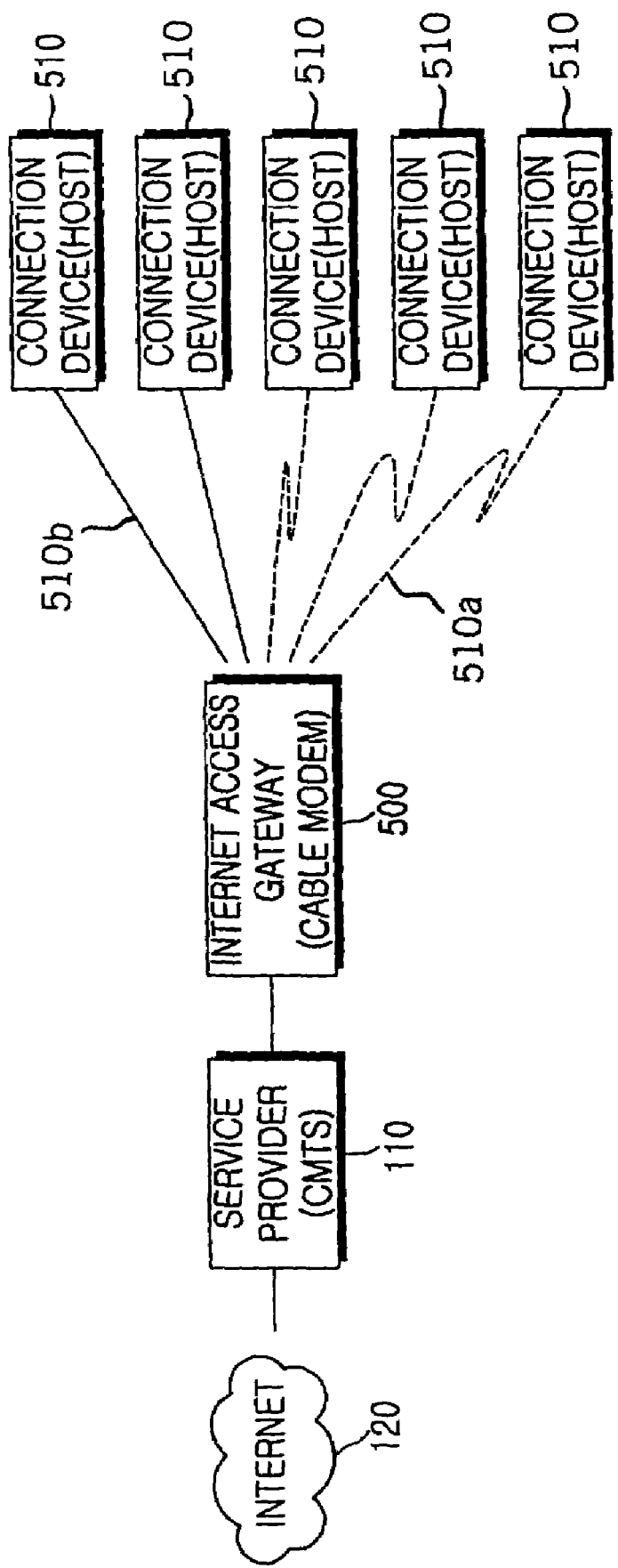
FIG. 5 is a view showing the configuration of a cable network, in accordance with the principles of the present invention.

FIG. 5 is a view showing the configuration of a cable network, in accordance with the principles of the present invention. As shown in FIG. 5, hosts 510 are connected to a cable modem (CM) 500 through a wireless line as denoted by dotted lines 510*b* or a wired medium as denoted by solid lines 510*a*. The wired medium 510*a* can be, for example, RJ-45(100/10Base-T). The cable modem 500 as described here corresponds to an Internet access gateway in a network. The cable modem 500 and the hosts 510 connected thereto constitute a single public network which is provided with a public Internet protocol (IP) address allocated by the cable modem termination process (CMTS) 110. The CMTS 110 is connected to Internet 120. The CMTS 110 can be referred to as an Internet service provider.

Figure 6:
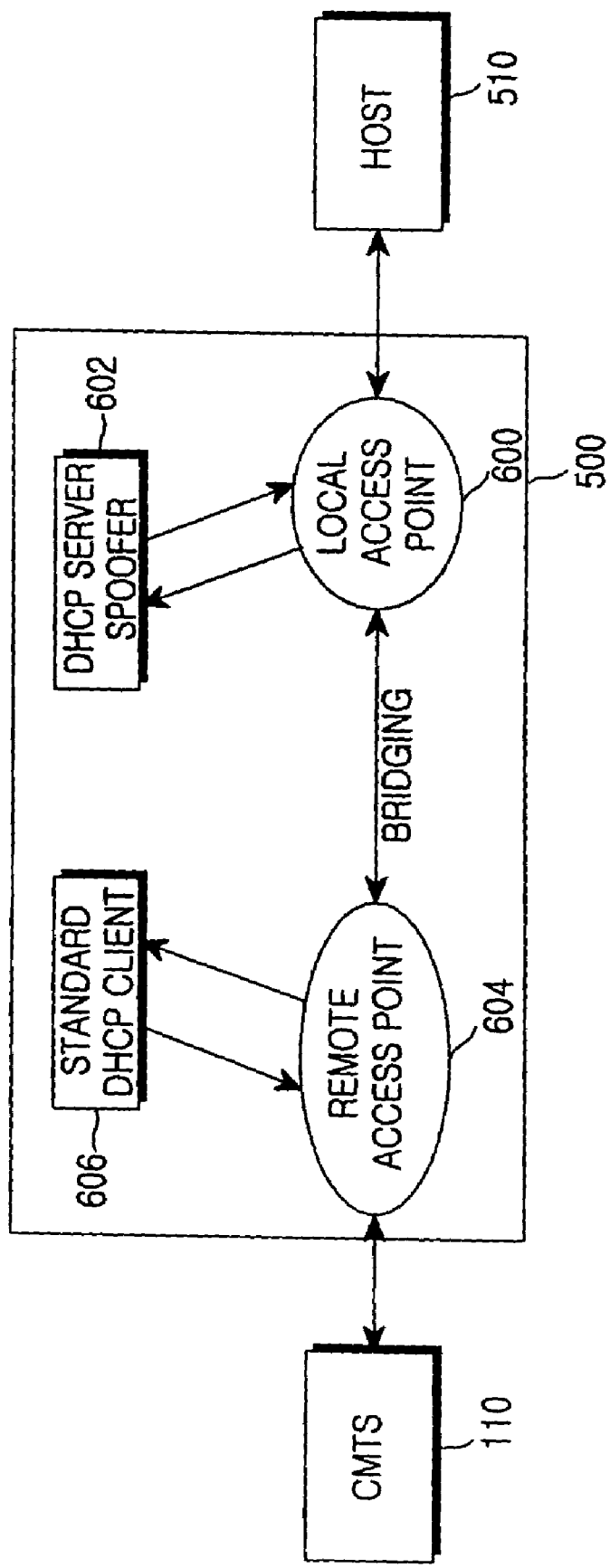
FIG. 6 is a view showing the basic operation of the cable modem (CM) included in the cable network of FIG. 5, in accordance with the principles of the present invention.

FIG. 6 is a view showing the basic operation of the cable modem included in the cable network of FIG. 5, in accordance with the principles of the present invention. The cable modem 500 includes at least a dynamic host configuration protocol (DHCP) server spoofer 602 and a standard dynamic host configuration protocol (DHCP) client 606. The dynamic host configuration protocol (DHCP) client 606 of the cable modem 500 is allocated an Internet protocol (IP) address by gaining access to a dynamic host configuration protocol (DHCP) server of the cable modem termination process (CMTS) 110. The dynamic host configuration protocol (DHCP) server spoofer 602 serves as a dynamic host configuration protocol (DHCP) server with respect to the hosts 510 connected to the cable modem 500. The local access point 600 and remote access point 604 are also included in the cable modem 500.

In general, a spoofing technique can involve a modification or configuration of packet headers, so that packets sent from a system appear to originate from a predetermined address that may be artificial or different from the true address of that system. This spoofing technique is utilized by the spoofing server 602 shown in FIG. 6.

Figure 7:
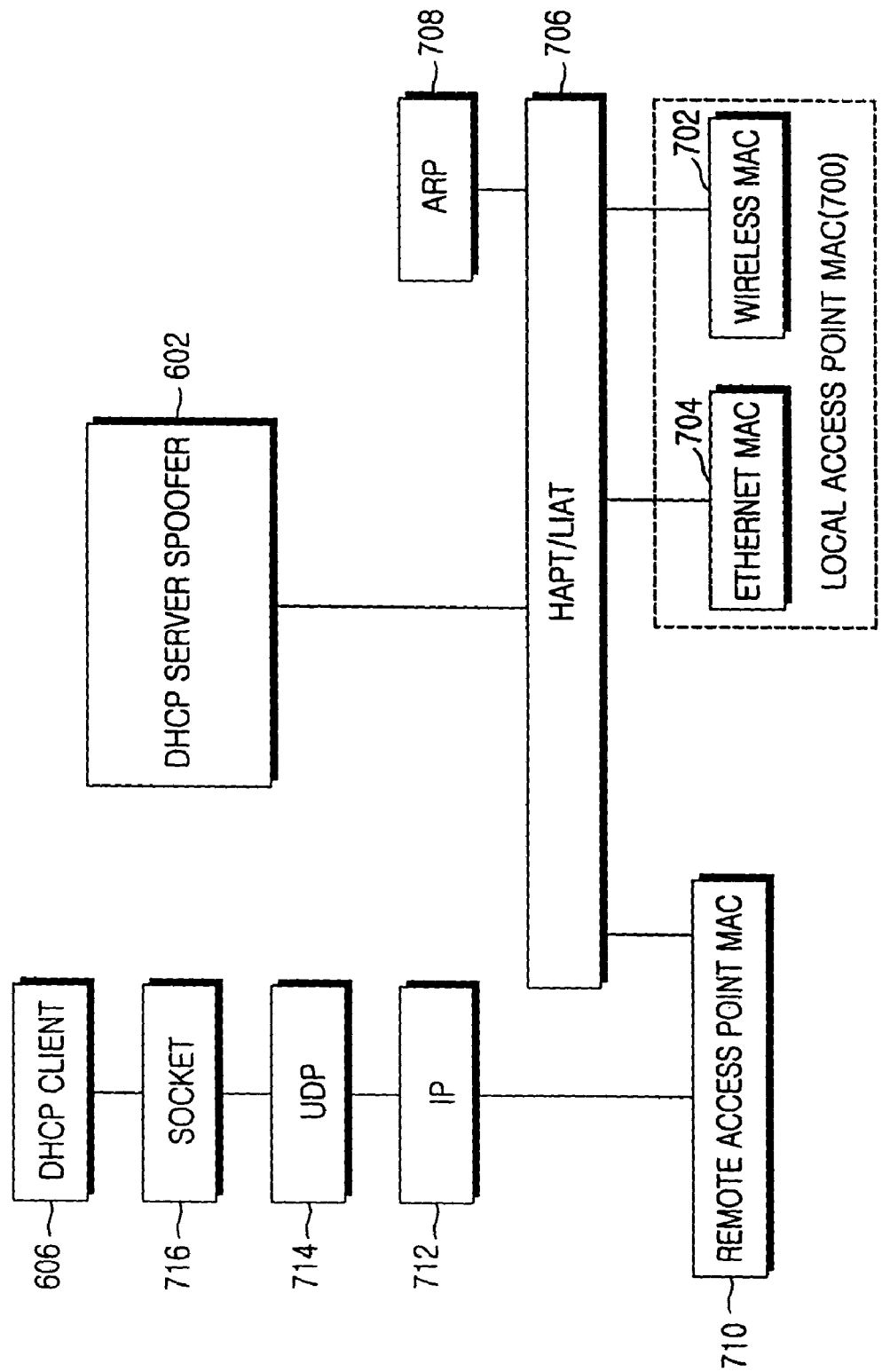
FIG. 7 is a functional block view showing the Internet protocol (IP) address spoofing operation performed by the cable modem of FIG. 6, in accordance with the principles of the present invention.

FIG. 7 is a functional block view showing the Internet protocol (IP) address spoofing operation performed by the cable modem of FIG. 6, in accordance with the principles of the present invention. It is preferable that the connection to the cable modem 500 through the RJ-45(10/100Base-T) is performed in a system where a transmission control protocol/Internet protocol (TCP/IP) communication is performed always via the local access point 600 as a wireless LAN system. That is, it should not allow a number of hosts to be shared by connecting a device such as a hub between the cable modem 500 and the hosts through the RJ-45. The cable modem 500 including a wireless LAN has characteristics such that all packets are transmitted to a corresponding host 510 after being collected to the local access point 600. FIG. 7 shows local access point medium access control (MAC) 700 including wireless MAC 702 and Ethernet MAC 704. The FIG. 7 also shows HAPT/LIAT 706, ARP 708, and remote access point MAC 710. IP 712, UDP 714, socket 716, DHCP client 606, and DHCP server spoofer 602 are also shown in FIG. 7.

Figure 8:
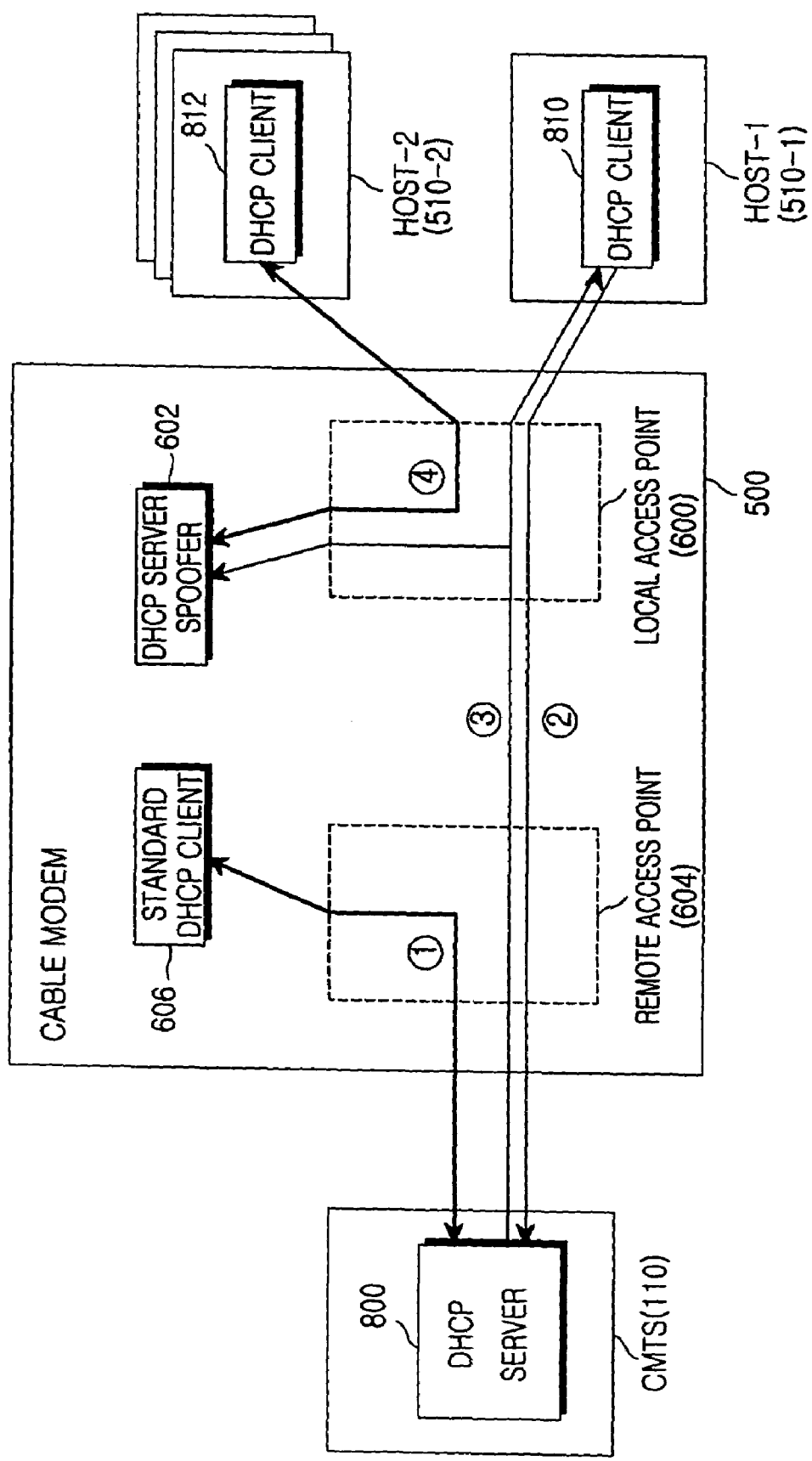
FIG. 8 is a view showing the flow of dynamic host configuration protocol (DHCP) messages for Internet protocol (IP) address allocation, in accordance with the principles of the present invention.

FIG. 8 is a view showing the flow of dynamic host configuration protocol (DHCP) messages for Internet protocol (IP) address allocation, in accordance with the principles of the present invention. The method for allocating an Internet protocol (IP) address, in accordance with the principles of the present invention, is as follows. The dynamic host configuration protocol (DHCP) client 606 of the cable modem 500 is assigned an Internet protocol (IP) address through a dynamic host configuration protocol (DHCP) message communication ① with the dynamic host configuration protocol (DHCP) server 800 in the cable modem termination process (CMTS) 110 as shown in FIG. 8. A dynamic host configuration protocol (DHCP) client 810 in one host (host-1 510-1), of the hosts connected to the cable modem 500, is assigned an Internet protocol (IP) address through dynamic host configuration protocol (DHCP) message communication ② and ③ with the dynamic host configuration protocol (DHCP) server 800 of the cable modem termination process (CMTS) 110. The cable modem 500 captures a DHCP ACK (acknowledgment) message transmitted from the cable modem termination process (CMTS) 110 to the host 510 to construct network configuration information such as an Internet protocol (IP) address in the dynamic host configuration protocol (DHCP) server spoofer 602.

When the dynamic host configuration protocol (DHCP) server spoofer 602 is constructed with the network configuration information, the spoofer 602 performs a process ④ on the dynamic host configuration protocol (DHCP) messages which the other hosts connected to the cable modem 500 transmit through the dynamic host configuration protocol (DHCP) clients 810 and 812 in order to be assigned Internet protocol (IP) addresses. The dynamic host configuration protocol (DHCP) server spoofer 602 transmits the already constructed network configuration information to each of the other hosts. That is, the Internet protocol (IP) address that the first host (host-1 510-1) has received from the cable modem termination process (CMTS) 110 is commonly assigned to each of the other hosts 510.

A data frame forwarding inside the cable modem 500 is performed through a link-layer bridging. The management on the medium access control (MAC) address and port number is performed as follows.

Figure 21:
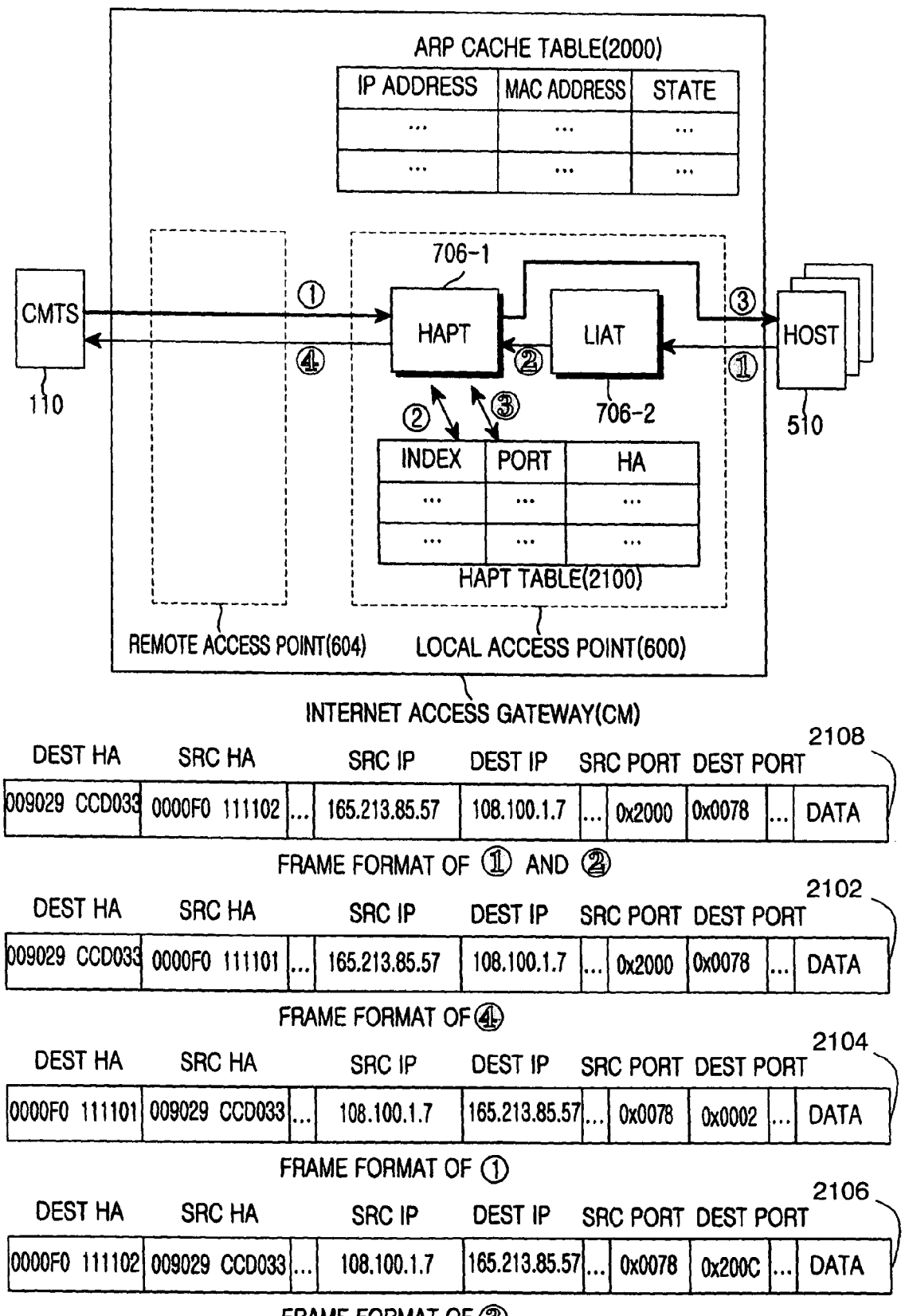
FIG. 21 is a view illustrating message flows in a transmission control protocol/Internet protocol (TCP/IP) communication to the Internet network, in accordance with the principles of the present invention.

The local access point 600 of the cable modem 500 has a hardware address port translation (HAPT) function 706-1. The hardware address port translation (HAPT) 706-1 produces and manages a hardware address port translation (HAPT) table 2100, as shown in FIG. 21. The hardware address port translation (HAPT) 706-1 modifies the source medium access control (MAC) address and port number of a frame received from each of the hosts 510, and stores the modified results in the hardware address port translation (HAPT) table 2100. The hardware address port translation (HAPT) 706-1 also restores the destination medium access control (MAC) address and port number of a frame received from the cable modem termination process (CMTS) 110.

The hardware address port translation (HAPT) 706-1 performs the following process on the frame received from the host 510. After the cable modem 500 is booted or started up, when one of the hosts 510 connected to the cable modem 500 firstly transmits an address resolution protocol (ARP) request to the cable modem termination process (CMTS) 110, the local access point 600 of the cable modem 500 stores the medium access control (MAC) address of the host 510 as a representative medium access control (MAC) address. Thereafter, the hardware address port translation (HAPT) uses the stored medium access control (MAC) address as a source medium access control (MAC) address when a host other than the first host transmits an Ethernet frame to the cable modem termination process (CMTS) 110.

When a frame is transmitted from each of the hosts 510 toward the Internet network, the hardware address port translation (HAPT) modifies the source medium access control (MAC) address of the frame and the source port number to the representative medium access control (MAC)

address and a different port number, respectively. This modified information will be used to modify a frame, received as a response, to the corresponding host's medium access control (MAC) address. After storing the modified information in the hardware address port translation (HAPT) table, the hardware address port translation (HAPT) transmits such a modified frame to the Internet network.

The hardware address port translation (HAPT) performs the following process on the frame received from the cable modem termination process (CMTS) 110. When a frame as a response to the frame transmitted from each of the hosts to the Internet network 120 is transmitted from the Internet network 120 toward each of the hosts, the hardware address port translation (HAPT) modifies the destination port number and medium access control (MAC) address of the frame to its original port number and medium access control (MAC) address, respectively, with reference to the hardware address port translation (HAPT) table, and then transmits the modified frame to each of the hosts 510. On the other hand, the hardware address port translation (HAPT) does not perform any process on broadcast and multicast frames received from the cable modem termination process (CMTS) 110.

In order to prevent Internet protocol (IP) address collisions, the cable modem 500 prevents broadcast and multicast packets received from each of the hosts 510 from entering the hosts 510 subordinately connected to the cable modem 500. Such a procedure is performed by the local IP address translation (LIAT).

The local IP address translation (LIAT) is provided in the local access point 600 of the cable modem 500 to prevent collisions inevitably occurring because the hosts 510 connected to the cable modem 500 have the same Internet protocol (IP) address. With respect to each medium access control (MAC) address of the hosts, the local IP address translation (LIAT) registers a separate Internet protocol (IP) address, which exists in the same subnet, in an address resolution protocol (ARP) cache table of the cable modem 500. Thereafter, source and destination Internet protocol (IP) addresses of Internet protocol (IP) packets are modified referring to the address resolution protocol (ARP) cache table before transmitting the Internet protocol (IP) packets from one host to other hosts.

Now, the operation of an Internet protocol (IP) allocation device, in accordance with the principles of the present invention, will be described in more detail. FIG. 8 is a view showing the flow of dynamic host configuration protocol (DHCP) messages for Internet protocol (IP) address allocation, in accordance with the principles of the present invention.

The Internet protocol (IP) address allocation is performed as follows. Network configuration information, such as an Internet protocol (IP) address, on each of the hosts and the cable modem 500 are produced through the dynamic host configuration protocol (DHCP). To this end, the cable modem 500 is provided with the dynamic host configuration protocol (DHCP) server spoofer 602 having a modified dynamic host configuration protocol (DHCP) server function, and the standard dynamic host configuration protocol (DHCP) client 606 modeled according to Request for Comments (RFC) 2132 and Request for Comments (RFC) 2132. When the cable modem 500 is booted, the dynamic host configuration protocol (DHCP) client 606 of the cable modem 500 is assigned an Internet protocol (IP) address through dynamic host configuration protocol (DHCP) message communication (①) with the dynamic host configuration protocol (DHCP) server 800 of the cable modem termination process (CMTS) 110.

Figure 9:
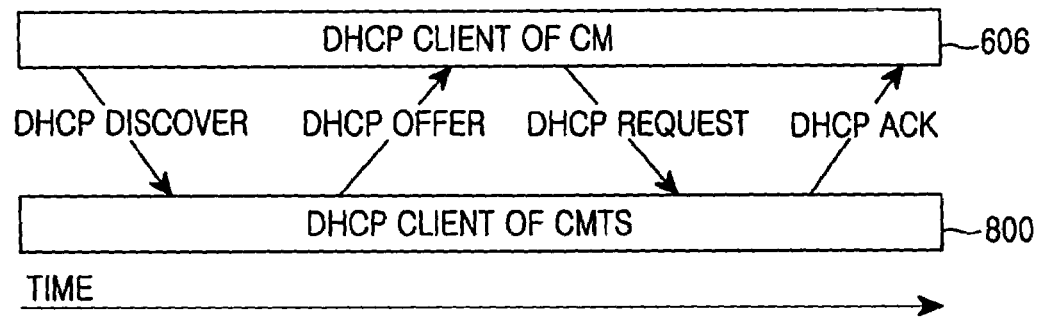
FIG. 9 is a view showing the procedure of exchanging dynamic host configuration protocol (DHCP) messages between the cable modem and the cable modem termination process (CMTS), in accordance with the principles of the present invention.

FIG. 9 is a view showing the procedure of exchanging dynamic host configuration protocol (DHCP) messages between the cable modem and the cable modem termination process (CMTS), in accordance with the principles of the present invention. The function and specification of each of the messages of FIG. 9 complies with Request for Comments (RFC) 2132 and Request for Comments (RFC) 2132. The message flow of FIG. 9 corresponds to the message flow denoted by "①" in FIG. 8.

Figure 10:
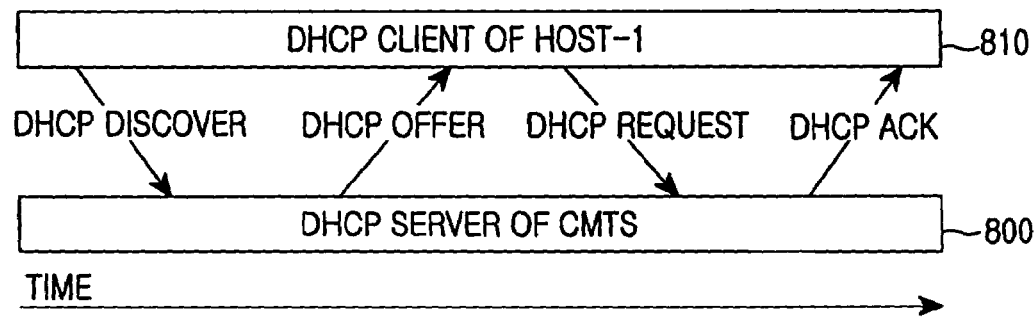
FIG. 10 is a view showing the procedure of exchanging dynamic host configuration protocol (DHCP) messages between the host-1 and the cable modem termination process (CMTS), in accordance with the principles of the present invention.

FIG. 10 is a view showing the procedure of exchanging dynamic host configuration protocol (DHCP) messages between the host-1 and the cable modem termination process (CMTS), in accordance with the principles of the present invention. The function and specification of each of the messages of FIG. 10 comply with Request for Comments (RFC) 2132 and Request for Comments (RFC) 2132. The message flows of FIG. 10 correspond to the message flows denoted by "②" and "③" in FIG. 8.

The Internet protocol (IP) address allocation to a host-1 (510-1) is performed as follows.

The host-1 (510-1) is one of the hosts connected to the cable modem 500, and is the one host which is firstly allocated a public Internet protocol (IP) address as shown in FIG. 8. Similarly to the cable modem 500, the host-1 (510-1) is allocated network configuration information such as an Internet protocol (IP) address through dynamic host configuration protocol (DHCP) message communication ② and ③ with the dynamic host configuration protocol (DHCP) server 800 of the cable modem termination process (CMTS) 110. In this Internet protocol (IP) allocation procedure ② and ③, the cable modem 500 monitors a DHCP ACK message that is being transmitted from the cable modem termination process (CMTS) 110 to the host so as to store its network configuration information in a network configuration information structure of the dynamic host configuration protocol (DHCP) server spoofer 602.

Figure 11:
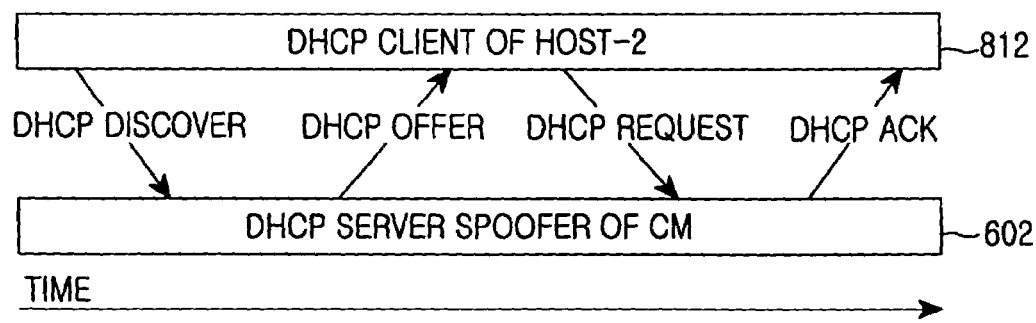
FIG. 11 is a view showing the procedure of exchanging dynamic host configuration protocol (DHCP) messages between the host-2 and the cable modem, in accordance with the principles of the present invention.

FIG. 11 is a view showing the procedure of exchanging dynamic host configuration protocol (DHCP) messages between the host-2 and the cable modem, in accordance with the principles of the present invention. The function and specification of each of the messages of FIG. 11 comply with Request for Comments (RFC) 2132 and Request for Comments (RFC) 2132. The message flow of FIG. 11 corresponds to the message flow denoted by "④" in FIG. 8.

The Internet protocol (IP) address allocation to the host-2 (510-2) is performed as follows. The host-2 (510-2) is any one of the hosts connected to the cable modem 500, other than the host-1 (510-1), since the host-1 (510-1) is the host that is firstly allocated a public Internet protocol (IP) address from the cable modem termination process (CMTS) 110. The host-2 (510-2) is allocated network configuration information such as an Internet protocol (IP) address through a dynamic host configuration protocol (DHCP) message communication ④ with the dynamic host configuration protocol (DHCP) server spoofer 602 of the cable modem 500. Here, the network configuration information allocated to the host-2 (510-2) is the same as that assigned to the host-1 (510-1).

The dynamic host configuration protocol (DHCP) server spoofer 602 provided in the cable modem 500 operates as follows. The dynamic host configuration protocol (DHCP) server spoofer 602 generally performs the same functions or similar functions as the standard dynamic host configuration protocol (DHCP) server modeled according to Request for Comments (RFC) 2132 and Request for Comments (RFC) 2132, but in a different manner. The spoofer 602 does not have an address pool, and thus spoofer 602 is different from the standard dynamic host configuration protocol (DHCP) server. This is to allocate network configuration information including the same Internet protocol (IP) address to all the hosts connected to the cable modem 500. When the standard dynamic host configuration protocol (DHCP) server receives a dynamic host configuration protocol (DHCP) discover message from a host, it retrieves an Internet protocol (IP) address from the address pool and allocates the retrieved Internet protocol (IP) address to the host, and then records information that the retrieved Internet protocol (IP) address is already allocated so that the already allocated Internet protocol (IP) address is not allocated to a different host which requests an Internet protocol (IP) address allocation in the future. This is different from the Internet protocol (IP) address spoofing scheme of the present invention. That is, instead of using the address pool, the dynamic host configuration protocol (DHCP) server spoofer 602 transmits the dynamic host configuration protocol (DHCP) message after incorporating the contents of a separate single-network host configuration information structure into the dynamic host configuration protocol (DHCP) message. When the contents of the host configuration information structure of the dynamic host configuration protocol (DHCP) server spoofer 602 corresponds to a default content value, the dynamic host configuration protocol (DHCP) server spoofer 602 does not transmit a dynamic host configuration protocol (DHCP) "offer" message in response to a dynamic host configuration protocol (DHCP) "discover" message received from the dynamic host configuration protocol (DHCP) client 810 and 812 of a host.

The cable modem 500 operates as follows. Data forwarding between the cable modem termination process (CMTS) 110 and the host via the cable modem 500 is performed through a link-layer bridging process, according to the following rules.

A medium access control (MAC) address learning process is firstly described. The cable modem 500 keeps and manages Ethernet medium access control (MAC) addresses of the hosts connected to the cable modem 500. To this end, the cable modem 500 constructs a medium access control (MAC) address table for storing and managing the Ethernet medium access control (MAC) addresses of the hosts. The cable modem 500 can store up to a maximum number of host Ethernet medium access control (MAC) addresses which the medium access control (MAC) address table can contain, besides the Internet protocol (IP) address information. If the cable modem 500 has the maximum number of host Ethernet medium access control (MAC) addresses, it disregards a host Ethernet medium access control (MAC) address that is newly learned thereafter. That is, the cable modem 500 does not replace any currently-managed medium access control (MAC) address with the newly learned medium access control (MAC) address. In addition, it is preferable that the cable modem 500 has at least one host medium access control (MAC) address. It is also preferable to always maintain the host medium access control (MAC) addresses stored in the medium access control (MAC) address table of the cable modem 500, as long as the cable modem 500 is powered on. Further, it is preferable to discard all host medium access control (MAC) addresses stored in the medium access control (MAC) address table of the cable modem 500 when the cable modem 500 is reset. This is to permit a modification of the host medium access control (MAC) address and a replacement of the cable modem 500.

Now, a link-layer frame forwarding process is described as follows. It is preferable that the link-layer frame forwarding process complies with an IEEE 802.1d guideline as described below. The IEEE 802.1d is the 802.1d Standard of the Institute of Electrical and Electronics Engineers, Inc. Link-layer frames must be delivered in order between the cable modem termination process (CMTS) 110 and the hosts. The link-layer frames must not be duplicated. It is preferable to discard stale frames whose time to live (TTL) has expired.

A forwarding from the Ethernet to the cable network must comply with the following specific rules. Frames addressed to unknown destinations must be forwarded from the local access point 600 which includes Ethernet and wireless ports to the remote access point 604 (or a cable port), referring to the medium access control (MAC) address table which is included in the cable modem 500 and stores the host Ethernet medium access control (MAC) addresses. It is preferable that broadcast frames are directly forwarded to the remote access point 604. That is, the frames such as an address resolution protocol (ARP) should not transmitted to the other hosts connected to the local access point. But, the dynamic host configuration protocol (DHCP) message must also be transmitted to the dynamic host configuration protocol (DHCP) server spoofer 602 of the cable modem 500. Multicast frames must be directly forwarded to the remote access point 604 according to filtering configuration settings specified by the cable operator's operations. In addition, while referring to the medium access control (MAC) address table which is included in the cable modem 500 and stores the host Ethernet medium access control (MAC) addresses, frames from an Ethernet medium access control (MAC) address not managed by the medium access control (MAC) address table must not be forwarded (source address check). It is preferable that the frames from the not-managed Ethernet medium access control (MAC) address are discarded at the local access point 600.

In the present invention, it is preferable that a forwarding from the cable network to the Ethernet is performed according to the following rules. Frames addressed to unknown destinations must not be forwarded from the remote access point 604 (a cable port) to the local access point 600 which includes Ethernet and wireless ports, while referring to the medium access control (MAC) address table which is included in the cable modem 500 and stores the host Ethernet medium access control (MAC) addresses. That is, it is preferable that frames addressed to unknown destinations are discarded at a cable medium access control (MAC).

Broadcast frames must be forwarded to the local access point 600. However, a broadcast frame from a source address learned as a host connected to the cable modem 500 must not be forwarded to the local access point 600. That is, it is preferable that a broadcast frame learned as a host connected to the cable modem 500 is discarded at the cable medium access control (MAC).

Multicast frames must be forwarded to the local access point 600 according to the filtering configuration settings specified by the cable operator's operations. However, a multicast frame from a source address learned as a host connected to the cable modem 500 must not be forwarded to the local access point 600. That is, it is preferable that a multicast frame learned as a host connected to the cable modem 500 is discarded at the cable medium access control (MAC).

Figure 12:
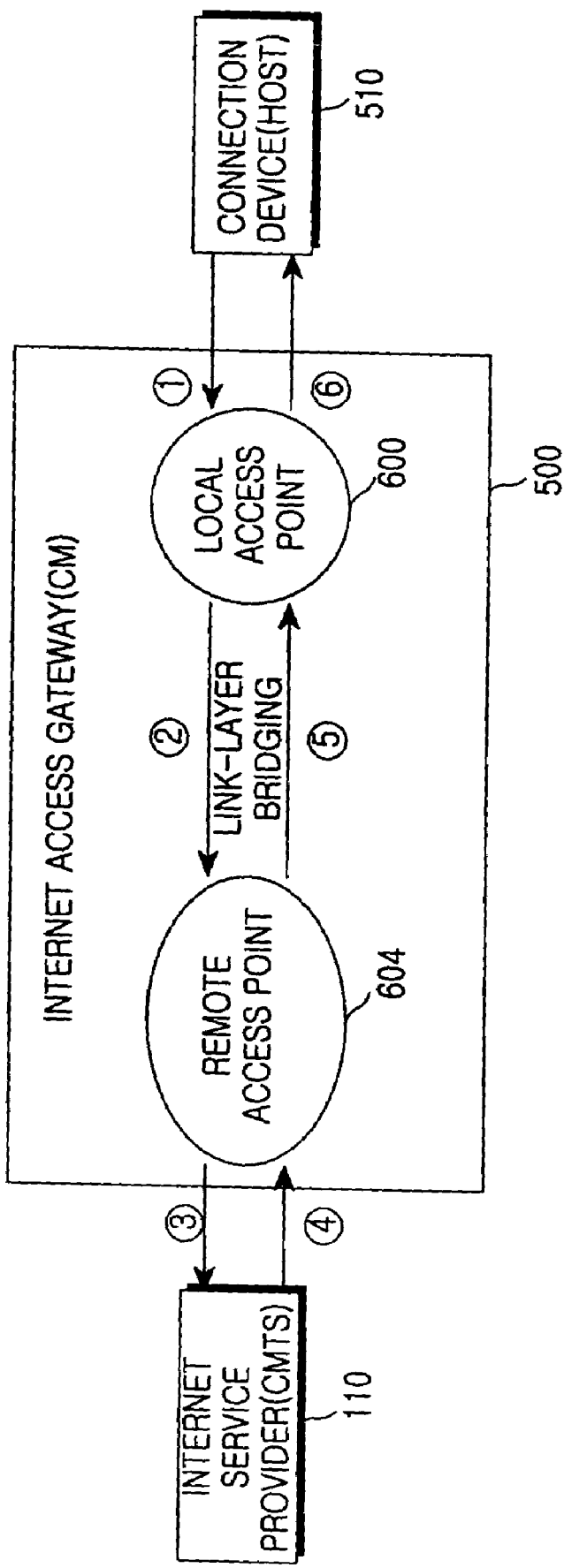
FIG. 12 is a view showing frame flows in the cable modem (CM), in accordance with the principles of the present invention.

The local access point 600 of the cable modem 500 performs a process as described below on the dynamic host configuration protocol (DHCP) message. FIG. 12 is a view showing frame flows in the cable modem, in accordance with the principles of the present invention. The local access point 600 of the cable modem 500 monitors a DHCP ACK message of a frame which is being transmitted to the host via a procedure ① in FIG. 12, and then the cable modem 500 copies the network configuration information of the frame into the host configuration information structure of the dynamic host configuration protocol (DHCP) server spoofer 602 included in the cable modem 500. Thereafter, a dynamic host configuration protocol (DHCP) offer message which enters the local access point 600 from the host-2 (510-2) (FIG. 8) through a procedure ① of FIG. 12 is not delivered to the remote access point 604. That is, the dynamic host configuration protocol (DHCP) offer message is processed so as to be delivered only to the dynamic host configuration protocol (DHCP) server spoofer 602 of the cable modem 500.

However, a dynamic host configuration protocol (DHCP) offer message which enters the local access point 600 from the host-1 (510-1) (FIG. 8) through the procedure ① of FIG. 12 is directly delivered to the remote access point 604. The host-1 (510-1) and the host-2 (510-2) are shown in FIG. 8.

Now, the operation of the hardware address port translation (HAPT) is described as follows. The hardware address port translation (HAPT) is located at the local access point 600, and produces and manages the hardware address port translation (HAPT) table. In addition, the hardware address port translation (HAPT) modifies the port number and source hardware address of a frame received from each of the hosts, and stores the modified results in the hardware address port translation (HAPT) table. Here, the source hardware addresses of all the frames that are transmitted from the local access point 600 to the remote access point 604 are modified to become the hardware address of the host-1 (510-1) of FIG. 8. Further, the hardware address port translation (HAPT) modifies the destination hardware address and port number of a frame transmitted to the local access point 600 from the remote access point 604, with reference to the hardware address port translation (HAPT) table. That is, the hardware address port translation (HAPT) functions to recover the source hardware address and the port number so as to correctly transmit a corresponding response frame to a host which transmits a request frame.

Now, the configuration of the hardware address port translation (HAPT) table managed by the hardware address port translation (HAPT) is described as follows. The following Table 2 shows one example of the hardware address port translation (HAPT) table.

TABLE 2

| Hash Key | Source Address | Source Port | Destination Address | Destination Port | Expire Time |
|---|---|---|---|---|---|
| 102 | 0000F0 111101 | 0x100c | 009027 CCD033 | 0x8900 | 300 |
| 106 | 0000F0 111102 | 0x200c | 009027 CCD033 | 0x4300 | 300 |
| . | . | . | . | . | . |
| . | . | . | . | . | . |
| . | . | . | . | . | . |
| 112 | 0000F0 11110A | 0x300c | 009027 CCD033 | 0x8900 | 300 |

As shown in Table 2, the hardware address port translation (HAPT) table includes hash keys, source addresses, source ports, destination addresses, destination ports, and expire times. For example, let us presume that ten hosts are commonly assigned a private Internet protocol (IP) address of 165.213.85.57. In addition, let us presume that, as shown in Table 2, 0000F0111101 to 0000F01110A are given as host hardware addresses, and each of 10 hosts has one entry. In order to achieve a high access speed, a hash key produced through a hash function is used as an index to produce each of the entries of Table 2 in the linked list form. Such a method has an advantage in that the frame received from the cable modem termination process (CMTS) 110 can be processed to modify its hardware address and port number at a uniform speed, irrespective of the number of hosts connected to the cable modem. Here, a timer task for a hardware address port translation (HAPT) table management is operated to count down a number in a limit time field at regular intervals. If an entry has a number "0" in the limit time field, it is processed as an entry with no answer. That is, such an entry is removed from the hardware address port translation (HAPT).

The hardware address of the host-1 (510-1) is stored as described below. Referring to FIG. 10, dynamic host configuration protocol (DHCP) messages are exchanged when an Internet protocol (IP) address is allocated to the host-1 (510-1). The network configuration information of a DHCP ACK message transmitted from the cable modem termination process (CMTS) 110 to the host-1 (510-1), among the exchanged dynamic host configuration protocol (DHCP) messages, is delivered from the local access point 600 to the dynamic host configuration protocol (DHCP) server spoofer 602, while the hardware address port translation (HAPT) stores the destination hardware address of a frame of transmitting the DHCP ACK message. Thereafter, the hardware address port translation (HAPT) is operated so that the source hardware addresses of all the frames transmitted from the local access point 600 to the remote access point 604 are modified to become the hardware address of the host-1 (510-1) that is stored in the hardware address port translation (HAPT).

The hardware address port translation (HAPT) performs the following process on frames received from the hosts. When a frame is transmitted from each of the hosts 510 toward the Internet network 120, the hardware address port translation (HAPT) modifies the source medium access control (MAC) address of the frame and the source port number to the representative medium access control (MAC) address and a different port number, respectively. This modified information will be used to modify a frame, received as a response, to the corresponding host's medium access control (MAC) address. After storing the modified information in the hardware address port translation (HAPT) table, the hardware address port translation (HAPT) transmits such a modified frame to the Internet network 120.

The hardware address port translation (HAPT) performs the following process on the frame received from the cable modem termination process (CMTS) 110. For example, let us presume that a frame as a response to the frame from the host 500 is transmitted toward the hosts from the Internet network 120. During this procedure, the hardware address port translation (HAPT) modifies the destination port number and hardware address of the frame to its original port number and hardware address, respectively, with reference to the hardware address port translation (HAPT) table, and then transmits the modified frame to each of the hosts 510. On the other hand, the hardware address port translation (HAPT) does not perform any process on broadcast and multicast frames received from the cable modem termination process (CMTS) 110.

Figure 13:
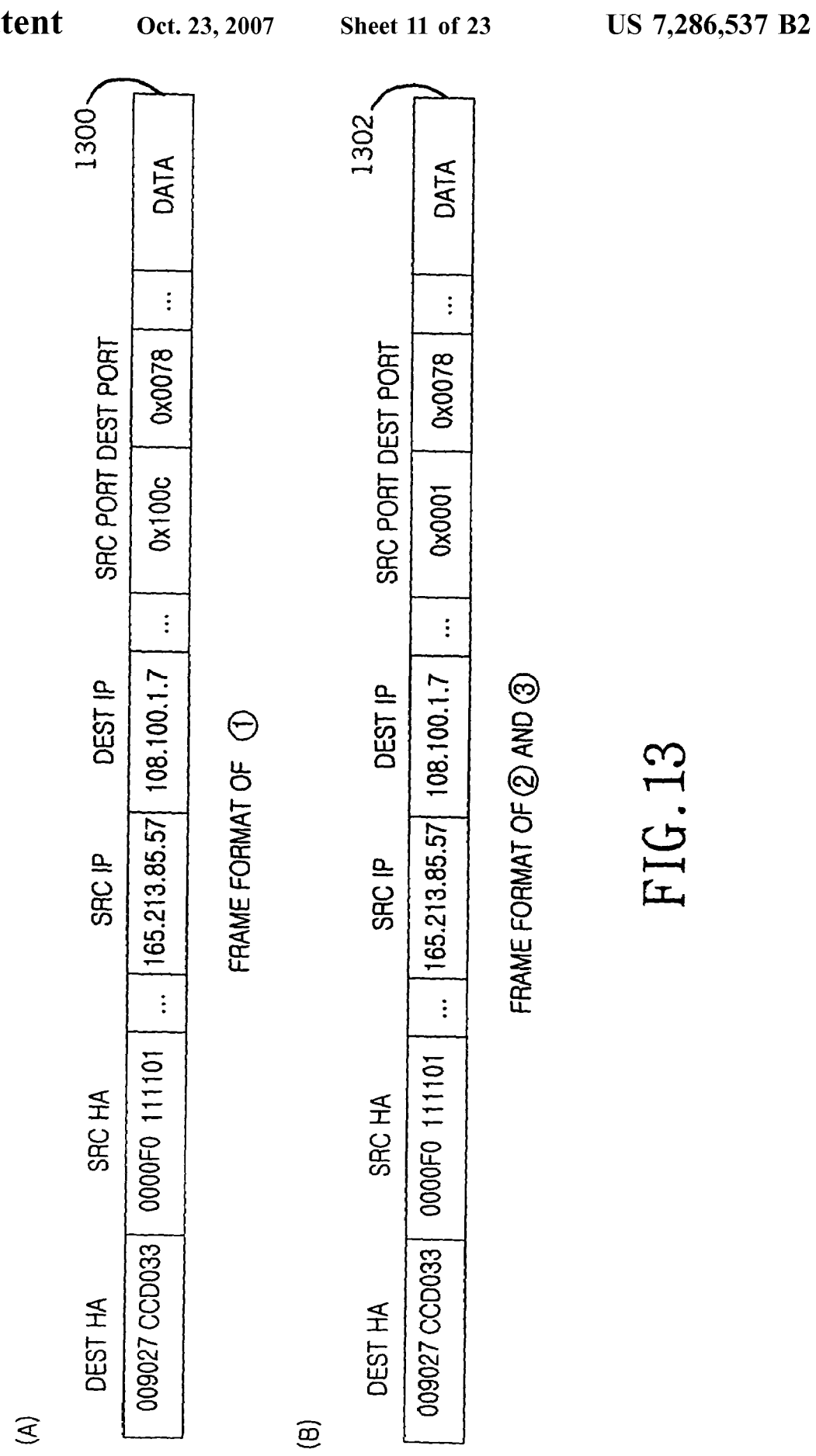
FIG. 13 is a view showing the structure of a frame forwarded from the host-1 to the cable modem termination process (CMTS), in accordance with the principles of the present invention.
Figure 14:
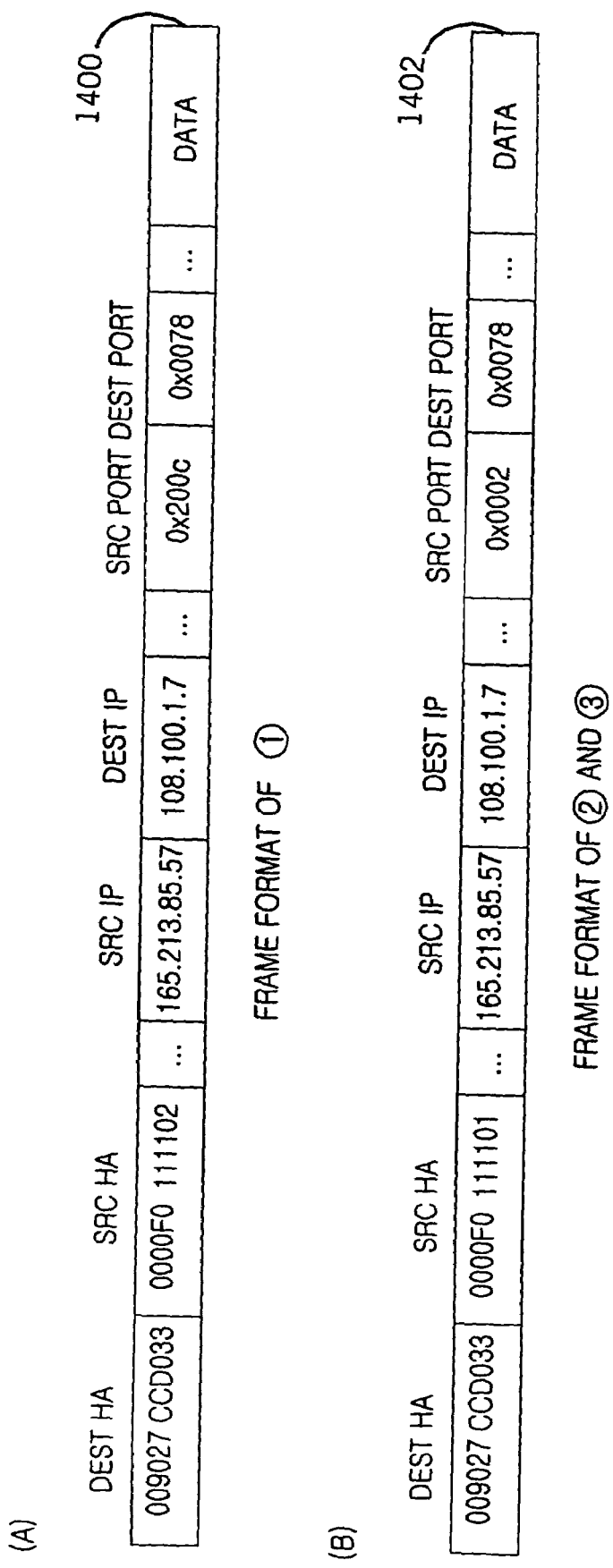
FIG. 14 is a view showing the structure of a frame forwarded from the host-2 to the cable modem termination process (CMTS), in accordance with the principles of the present invention.
Figure 15:
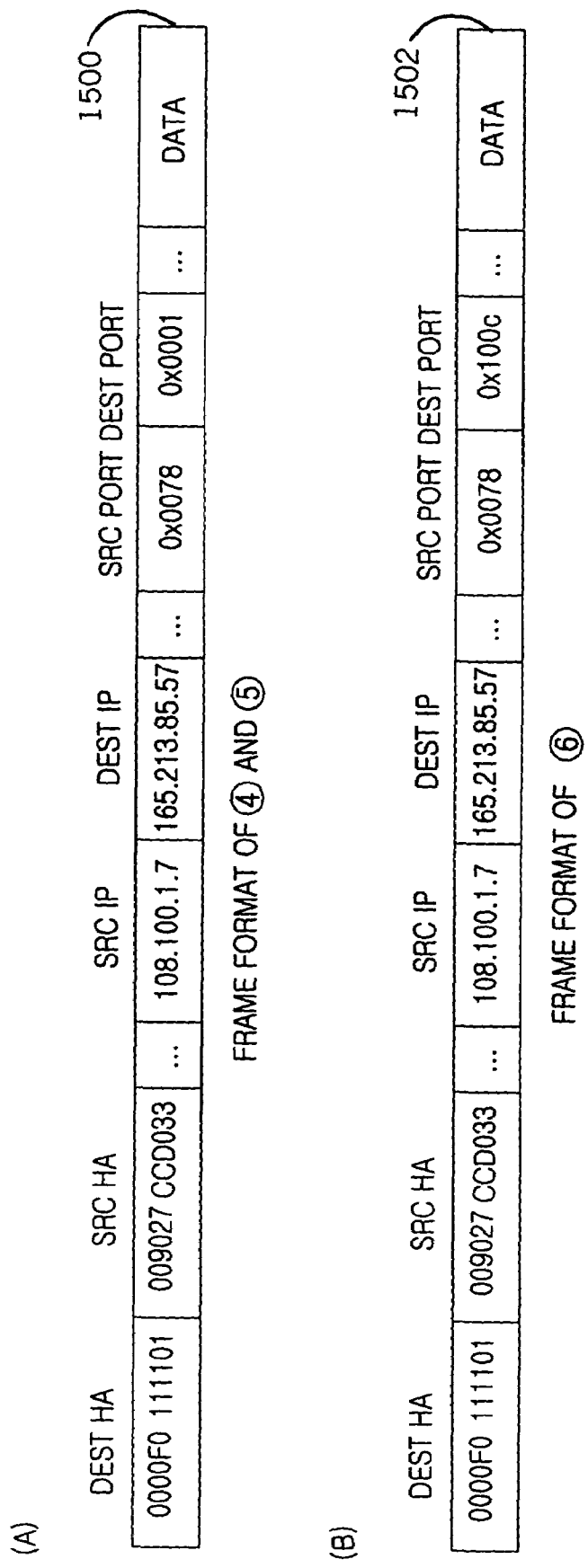
FIG. 15 is a view showing the structure of a frame forwarded from the cable modem termination process (CMTS) to the host-1, in accordance with the principles of the present invention.

FIG. 13 is a view showing the structure of a frame forwarded from the host-1 to the cable modem termination process (CMTS), in accordance with the principles of the present invention. FIG. 14 is a view showing the structure of a frame forwarded from the host-2 to the cable modem termination process (CMTS), in accordance with the principles of the present invention. FIG. 15 is a view showing the structure of a frame forwarded from the cable modem termination process (CMTS) to the host-1, in accordance with the principles of the present invention.

Figure 16:
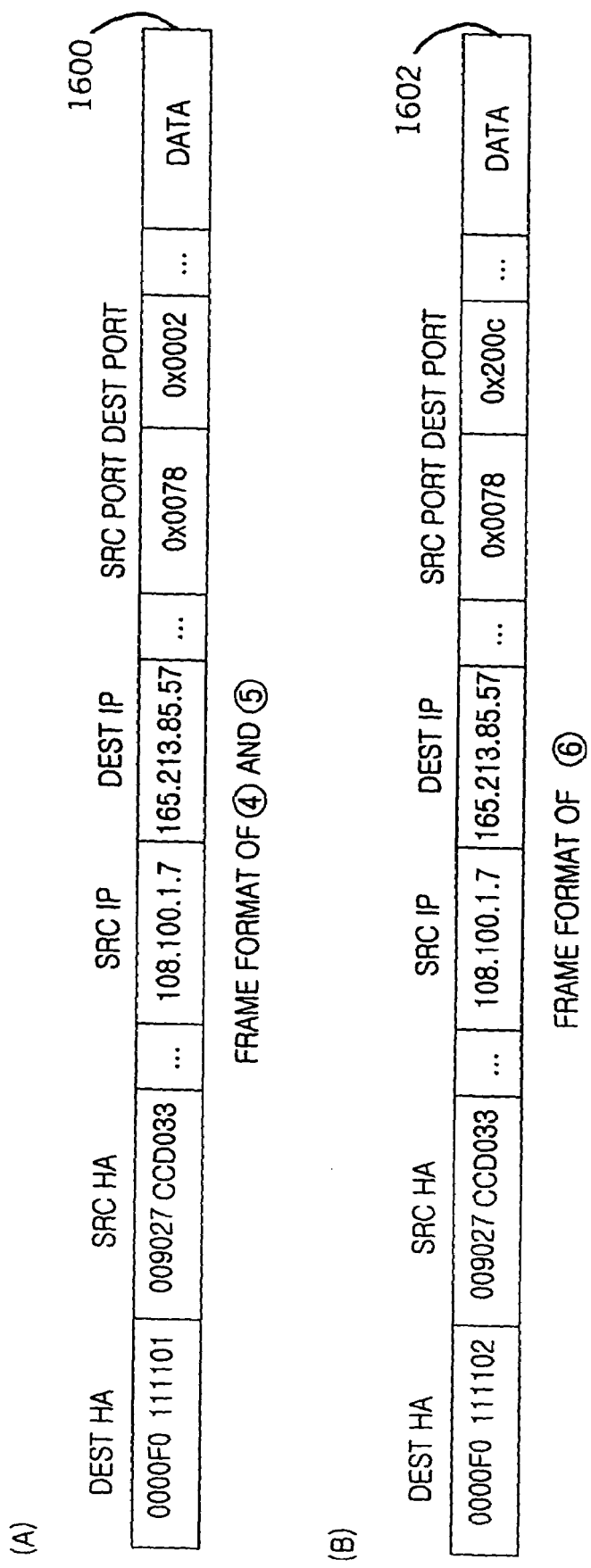
FIG. 16 is a view showing the structure of a frame forwarded from the cable modem termination process (CMTS) to the host-2, in accordance with the principles of the present invention.

FIG. 16 is a view showing the structure of a frame forwarded from the cable modem termination process (CMTS) to the host-2, in accordance with the principles of the present invention. The frame structures 1300, 1302, 1400, and 1402 of FIGS. 13 and 14 correspond to the structures of the frames in the procedures of ①, ②, and ③ in FIG. 12. The frame structures 1500, 1502, 1600, and 1602 of FIGS. 15 and 16 correspond to the structures of the frames in the procedure of ④, ⑤, and ⑥ in FIG. 12.

The procedure of processing the frames is described in detail referring to these figures. For example, it is assumed that the hardware address port translation (HAPT) table is configured as shown in Table 2, a public Internet protocol (IP) address of 165.213.85.57 is allocated to each of the hosts connected to the cable modem 500, and a cable modem termination process (CMTS) 110 on the Internet, whose Internet protocol (IP) address is 108.100.1.7, has an Ethernet hardware address of 009027 CCD033. When a host-1 (510-1) having an Ethernet hardware address of 0000F0111101 and a host-2 (510-2) having an Ethernet hardware address of 0000F0111102 transmit transmission control protocol/Internet protocol (TCP/IP) frames to 108.100.1.7, a link-layer forwarding is performed in the procedures of (a and (a in FIG. 12. A hardware address port translation (HAPT) operation is performed in the local access point 600. Accordingly, the frames transmitted from the host-1 (510-1) and the host-2 (510-2) have the same frame structure as the original frame structure in the procedure of ① of FIG. 12, but, as shown in FIGS. 13 and 14, they have different frame structures in the procedures of ② and ③ of FIG. 12.

On the other hand, when receiving a response frame to each of the transmission control protocol/Internet protocol (TCP/IP) frames transmitted from the host-1 (510-1) and host-2 (510-2) to 108.100.1.7, the remote access point 604 does not perform any process on the response frames as shown in FIGS. 15 and 16, and therefore the frame structures in the procedures of ④ and ⑤ are equal to each other. However, because the hardware address port translation (HAPT) of the local access point 600 modifies the frame structures as denoted by ⑥ in FIGS. 15 and 16, the frame can be correctly delivered to the original hosts.

FIGS. 23 to 27 are views showing message formats, in accordance with the principles of the present invention. That is, the present invention may be embodied according to the message formats shown in FIGS. 23 to 27. The message formats of FIGS. 23 to 27 are provided only to facilitate the understanding of the principles of the present invention, and therefore, of course, the present invention should not be limited to such formats. Transmission control protocol is shown as TCP, and user datagram protocol is shown as UDP.

Figure 25:
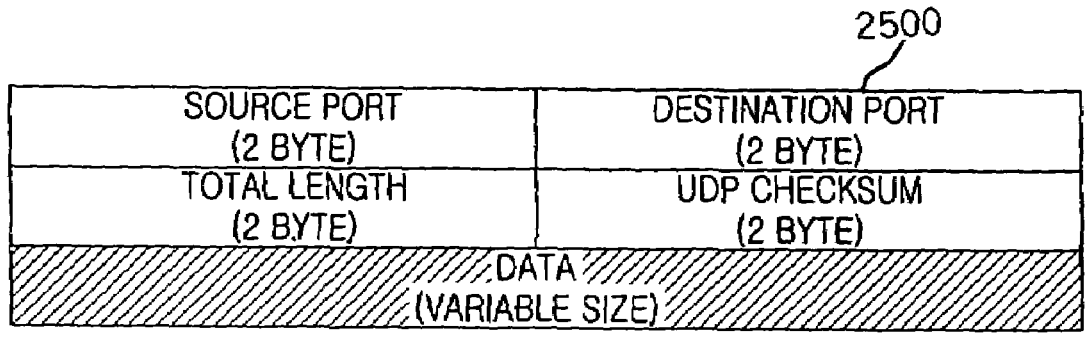
Figure 26:
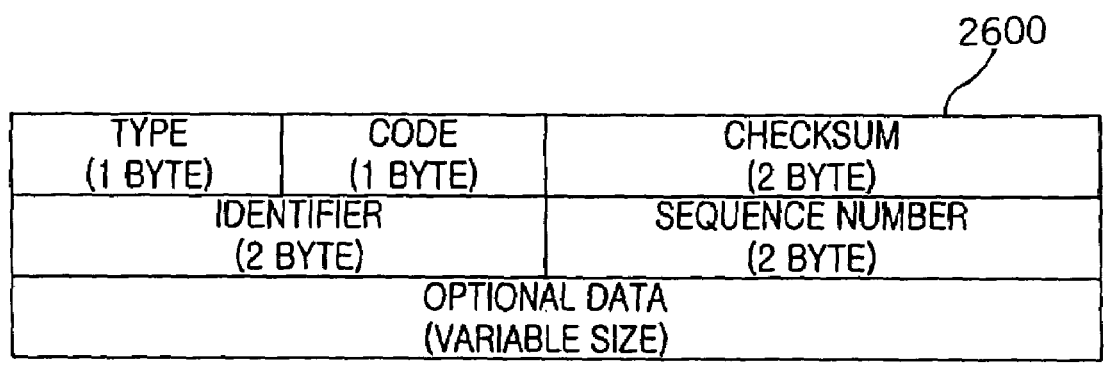
Figure 27:
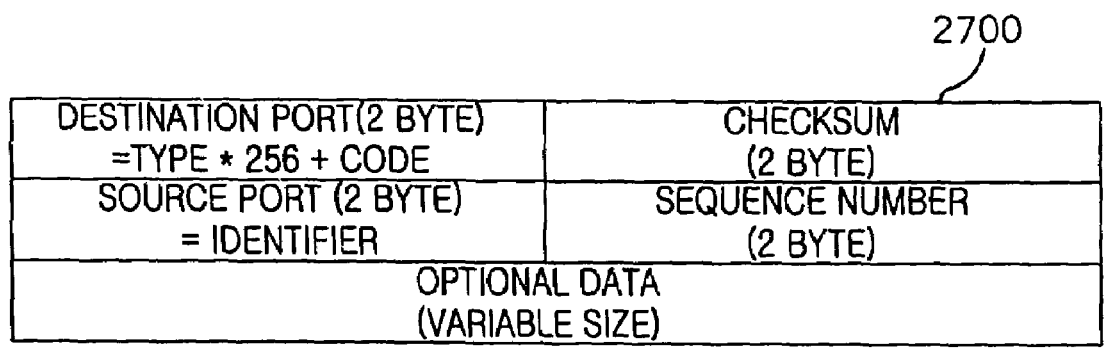

The frame process on Internet control message protocol (ICMP) messages is performed as follows. As shown in FIG. 26, the Internet control message protocol (ICMP) message does not have source port and destination port fields that exist in the header of TCP (FIG. 24) and UDP (FIG. 25) datagrams. Therefore, as shown in FIG. 27, two fields of Type (1 byte) and Code (1 byte) of FIG. 26 are combined to be processed for a source port, and a field of Identifier (2 byte) fields of FIG. 26 is processed for a destination port.

Here, the source port is expressed by the following Equation 1.

$$\text{SourcePort} = \text{Type} * 256 + \text{Code} \qquad \text{[Equation 1]}$$

Meanwhile, when the hardware address port translation (HAPT) operation is performed in such a manner, it is necessary to perform a checksum calculation two times. That is, it is necessary to calculate the checksum in the Internet control message protocol (ICMP) message and the transmission control protocol/user datagram protocol (TCP/UDP) header and write it in the packet, and then calculate the checksum in the Internet protocol (IP) header again and write it in the packet.

Figure 20:
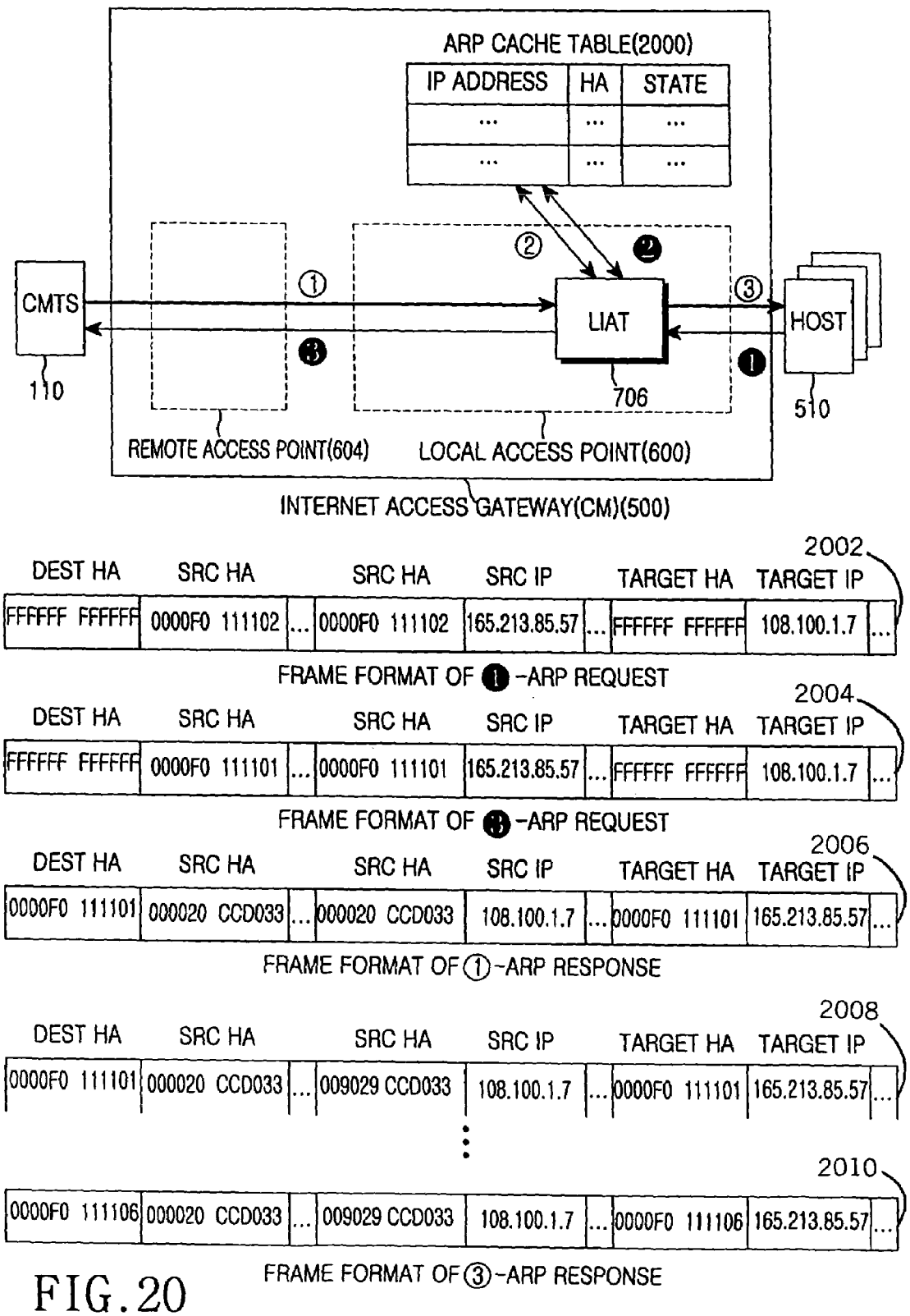
FIG. 20 is a view showing message flows in a transmission control protocol/Internet protocol (TCP/IP) communication to the Internet network, in accordance with the principles of the present invention.

The operation of the local IP address translation (LIAT) 706 is described as follows. The local IP address translation (LIAT) 706 is positioned at the local access point 600 of the cable modem 500 to manage the address resolution protocol (ARP) cache table 2000 of the cable modem 500, as shown in FIG. 20. That is, for each hardware address of the hosts, the local IP address translation (LIAT) registers a separate Internet protocol (IP) address, which exists in the same subnet, in an address resolution protocol (ARP) cache table of the cable modem 500, so as to differentiate the hosts from each other as if each of the hosts has a unique and different Internet protocol (IP) address from the viewpoint of the cable modem 500. Thereafter, when transmitting Internet protocol (IP) packets between the hosts, the local IP address translation (LIAT) modifies source and destination Internet protocol (IP) addresses referring to the address resolution protocol (ARP) cache table, and then transmits the Internet protocol (IP) packets from one host to the other hosts. On the other hand, the local IP address translation (LIAT) transmits packets, other than the Internet protocol (IP) packets directed toward the same subnet, to the hardware address port translation (HAPT) without performing any specific process on them.

In order to guarantee an Internet protocol (IP) security from a host connected to a different cable modem 500, it is preferable to permit a transmission control protocol/Internet protocol (TCP/IP) communication between hosts connected to the same cable modem 500, but not to permit a transmission control protocol/Internet protocol (TCP/IP) communication with a different cable modem 500 subordinately connected to the same cable modem termination process (CMTS) 110, or with hosts connected to the different cable modem 500.

In reality, there is little transmission control protocol/Internet protocol (TCP/IP) communication between the hosts connected to different cable modems 500 subordinate to the same cable modem termination process (CMTS) 110, and there is no demand for such a communication. In addition, according to a specification that at least one host commonly shares a single public Internet protocol (IP) address using the hardware address port translation (HAPT), it is impossible to perform a transmission control protocol/Internet protocol (TCP/IP) communication between the hosts connected to different cable modems 500. In such a manner, it is possible to guarantee an Internet protocol (IP) security from hosts connected to a different cable modem 500.

The cable modem 500 performs an address resolution protocol (ARP) cache table management as follows. Each of the hosts transmits a dynamic host configuration protocol (DHCP) request message for implementing a network information configuration. A DHCP ACK message as a response message of the dynamic host configuration protocol (DHCP)

request message passes through the local access point 600 of the cable modem 500. In the case where the DHCP ACK message passing through the local access point 600 is a DHCP ACK message directed toward the host-1 (510-1) shown in FIG. 8, the cable modem 500 adds its destination Internet protocol (IP) address and hardware address to the address resolution protocol (ARP) cache table as the corresponding Internet protocol (IP) address and hardware address in a permanent state.

On the other hand, in the case where the DHCP ACK message passing through the local access point 600 is a DHCP ACK message directed toward the host-2 (510-2) shown in FIG. 8, the cable modem 500 compares its destination hardware address with hardware addresses registered in the address resolution protocol (ARP) cache table. If the compared result is that the destination hardware address is not registered, after I is added to or subtracted from the latest value of the destination Internet protocol (IP) address (which is described later in detail), the added or subtracted destination Internet protocol (IP) address value, together with the destination hardware address, is added to the address resolution protocol (ARP) cache table as the corresponding Internet protocol (IP) address and hardware address in a permanent state.

Virtual Internet protocol (IP) addresses are allocated to each of the hosts and registered in the address resolution protocol (ARP) cache table of the cable modem 500 in such a manner that the latest Internet protocol (IP) address registered in the address resolution protocol (ARP) table is increased or decreased by 1 to be allocated to each of the hosts. The local access point 600 stores a network address as one local network including network and subnet IDs, which is obtained by performing a logical AND operation between a host Internet protocol (IP) address and a host subnet mask that have been stored in the dynamic host configuration protocol (DHCP) server spoofer 602 of the cable modem 500.

It is determined whether the latest Internet protocol (IP) address is decreased or increased by 1, in the following manner. By default, the latest Internet protocol (IP) address is increased by 1. Firstly, in the case where the Internet protocol (IP) address added by 1 becomes all 1s in the binary expression of the subnet field (that is, a limited broadcast address) which corresponds to the higher limit value of the subnet ID stored in the local access point 600, 1 is subtracted from the lowest Internet protocol (IP) address (initially, the IP address of the host-1) registered in the address resolution protocol (ARP) cache table, and the subtracted Internet protocol (IP) address is set to an Internet protocol (IP) address to be allocated to the corresponding host. Secondly, in the case where the subtracted Internet protocol (IP) address becomes all 0s in the binary expression of the subnet field (that is, a subnet address) which corresponds to the lower limit value of the subnet ID, a further Internet protocol (IP) address registration is not allowed. In such a manner, it is possible to limit the number of hosts that can be connected to a single cable modem 500.

An example of such an Internet protocol (IP) address allocation is described as follows. FIG. 17 is a view showing the list of configurable Internet protocol (IP) addresses for illustrating the procedure of generating subnet addresses, in accordance with the principles of the present invention.

In the case where the public Internet protocol (IP) address allocated to the hosts by the cable modem termination process (CMTS) 110 is 165.213.85.58, and the subnet mask is 255.255.255.248, the number of host Internet protocol (IP) addresses that can exist in the same subnet is 6 as shown by tables 1700 and 1702 in FIG. 17. In this case, because the public Internet protocol (IP) address allocated to the hosts by the cable modem termination process (CMTS) 110 is 165.213.85.58, the next virtual Internet protocol (IP) address that can be registered in the address resolution protocol (ARP) cache table of the cable modem 500 is increased by one to be 165.213.85.59. Other hosts connected to the cable modem 500 can be allocated virtual Internet protocol (IP) addresses, from 165.213.85.60 to 165.213.85.62, one by one. A virtual Internet protocol (IP) address to be allocated next to 165.213.85.62 is 165.213.85.63, but this corresponds to the limited broadcast address. This Internet protocol (IP) address of 165.213.85.63 cannot be allocated to the host. Thus, 165.213.85.57, which is a value reduced by one from the lowest value (165.213.85.58) of the previously allocated Internet protocol (IP) addresses, can be set as the next virtual Internet protocol (IP) address.

Figure 18:
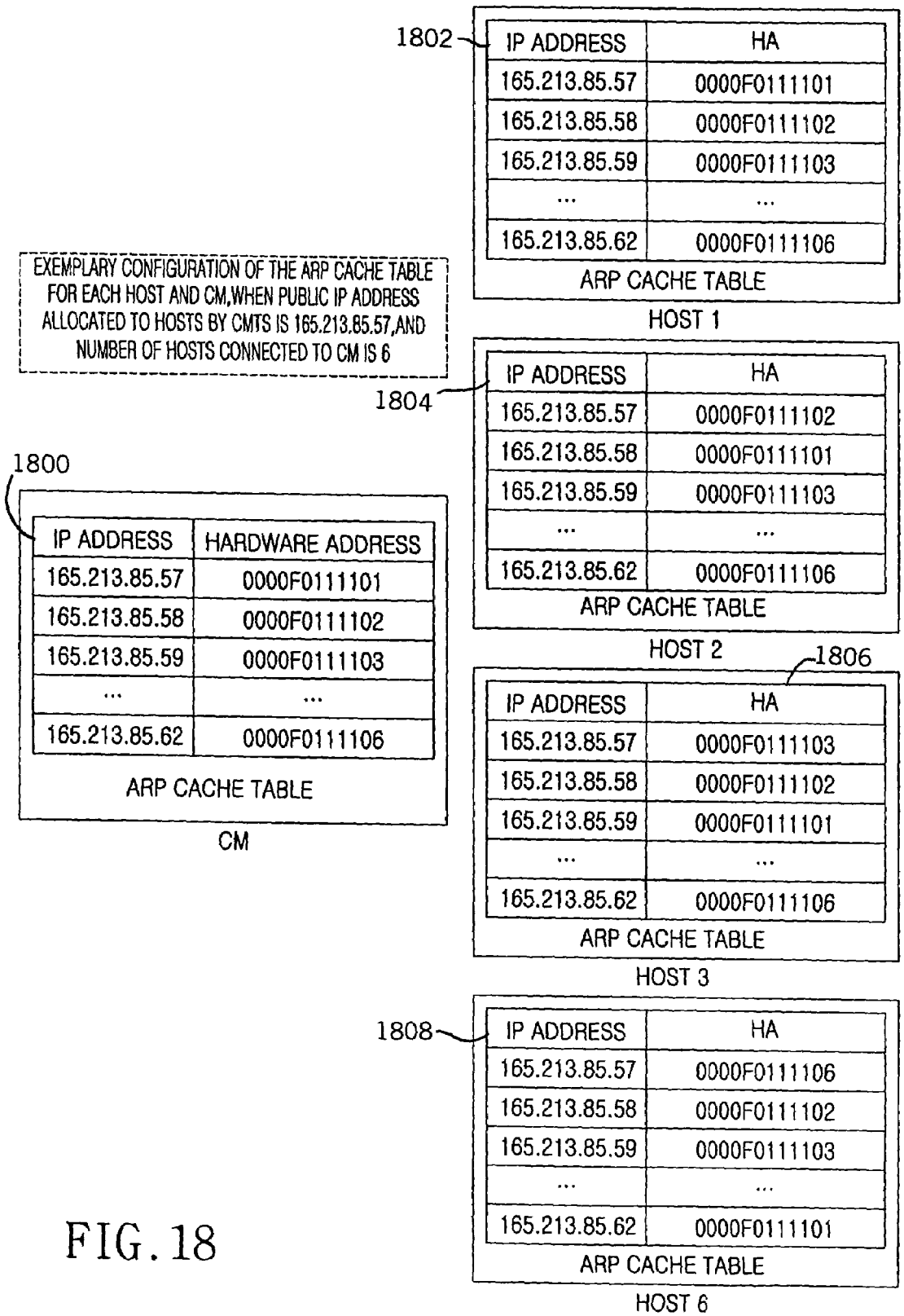
FIG. 18 is an exemplary view showing the configuration of the address resolution protocol (ARP) cache table for each of the hosts and the cable modem 500, in accordance with the principles of the present invention.

FIG. 18 is an exemplary view showing the configuration of the address resolution protocol (ARP) cache table for each of the hosts and the cable modem 500, in accordance with the principles of the present invention. If a new host is connected to the cable modem 500 after the Internet protocol (IP) address of 165.213.85.57 is allocated, causing an attempt to register an additional Internet protocol (IP) address in the address resolution protocol (ARP) cache table of the cable modem 500, this attempt is disregarded so as not to permit a further Internet protocol (IP) address registration. FIG. 18 shows ARP cache table 1800 of CM 500, ARP cache table 1802 of host 1, ARP cache table 1804 of host 2, ARP cache table 1806 of host 3, and ARP cache table 1808 of host 6.

Figure 19:
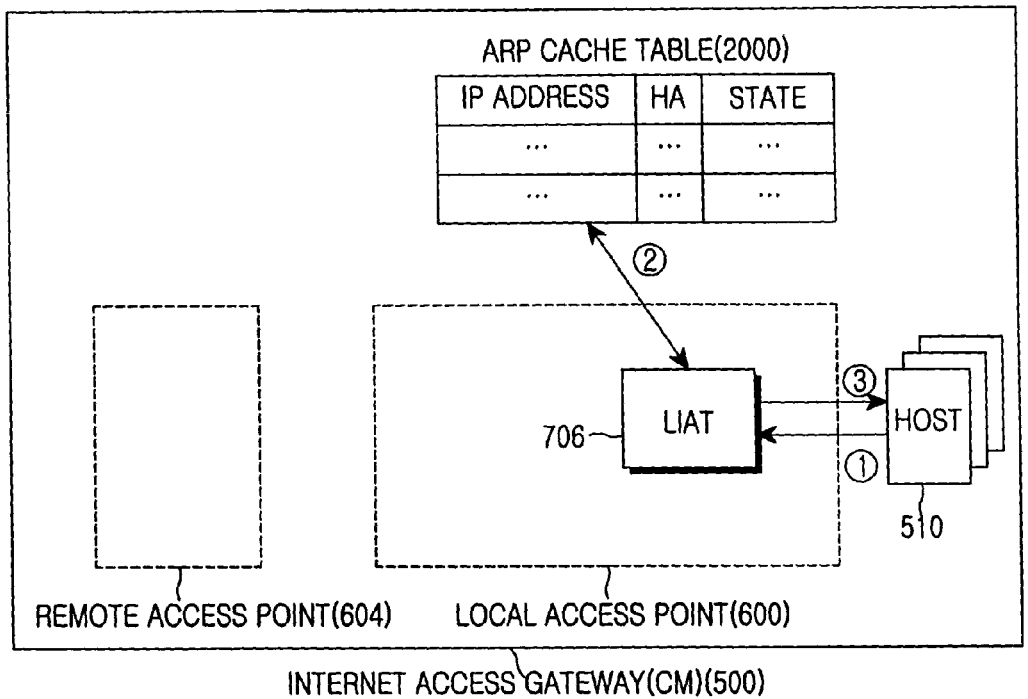
FIG. 19 is a view showing message flows in a transmission control protocol/Internet protocol (TCP/IP) communication between hosts, in accordance with the principles of the present invention.

FIG. 19 is a view showing message flows in a transmission control protocol/Internet protocol (TCP/IP) communication between hosts, in accordance with the principles of the present invention. The local access point 600 receives an address resolution protocol (ARP) request frame 1900 from the host 510 in procedure ① shown in FIG. 19. Then a checking procedure A) is performed to check whether a destination Internet protocol (IP) address contained in the address resolution protocol (ARP) request frame 1900 has been registered in the address resolution protocol (ARP) cache table 2000, before transmitting it to the remote access point 604. If the checked result is affirmative, it means that procedure ① corresponds to a communication between hosts connected to the same cable modem 500, and that is known as inter-host communication. On the other hand, if the checked result is not affirmative, procedure ① corresponds to a communication between hosts or cable modems 500 connected to different cable modem termination processes (CMTSs) 110. When the destination IP address contained in frame 1900 has been registered in table 2000, this means that the destination IP address contained in frame 1900 has been stored or saved in table 2000.

Referring to FIG. 19, the procedure of transmitting an address resolution protocol (ARP) request 1900 from a host 510 to the cable modem 500 in the case where its destination Internet protocol (IP) address has been registered in the address resolution protocol (ARP) cache table 2000 is described as follows. When the destination Internet protocol (IP) address has been registered in the address resolution protocol (ARP) cache table 2000, this means that frame 1900 is an inter-host frame. Thus, the local access point 600 produces an address resolution protocol (ARP) response frame 1902 based on information on the address resolution protocol (ARP) request frame 1900 registered in the address resolution protocol (ARP) cache table 2000, and transmits the produced address resolution protocol (ARP) response frame 1902 to the host 510 in procedure ③. Here, it is not permitted to transmit the address resolution protocol (ARP) request frame 1900 to the remote access point 604. As shown in FIG. 19, when a host corresponding to 165.213.85.59 transmits an address resolution protocol (ARP) request frame 1900 so as to obtain the hardware address (HA) corresponding to 165.213.85.59, the local IP address translation (LIAT) 706 obtains the hardware address corresponding to 165.213.85.59 from the address resolution protocol (ARP) cache table 2000, and performs procedure ③ to transmit an address resolution protocol (ARP) response frame 1902 containing the obtained hardware address. The information in frame 1902 is for inter-host communication and is not for communication with CMTS 110.

FIG. 20 is a view showing message flows in a transmission control protocol/Internet protocol (TCP/IP) communication to the Internet network, in accordance with the principles of the present invention. The fact that the destination Internet protocol (IP) address has not been registered in the address resolution protocol (ARP) cache table 2000 means that the target Internet protocol (IP) address of the address resolution protocol (ARP) request frame 2002 that the local IP address translation (LIAT) 706 received from the host 510 in procedure ❶does not correspond to the subnet of the host 510. The local IP address translation (LIAT) 706 modifies the Internet protocol (IP) address and the hardware address of the source of the frame 2002 to an Internet protocol (IP) address and a hardware address of the host-1 (510-1) of FIG. 8, and then transmits the modified frame 2004 to the remote access point 604 in procedure ❷. When the cable modem (CM) 500 receives an address resolution protocol (ARP) response frame 2006 in procedure ① from the cable modem termination process (CMTS) 110, in response to the address resolution protocol (ARP) request frame 2004 sent to the CMTS 110 in procedure ❷, the ARP response frame 2006 is transmitted from the remote access point 604 to the local access point 600. At this time, the local IP address translation (LIAT) 706 incorporates a hardware address of each of all the hosts stored in the address resolution protocol (ARP) cache table 2000 into the target hardware address of the corresponding address resolution protocol (ARP) response frame 2008-2010, and then transmits it to each of the hosts in procedure ③.

Let us assume as an example of FIG. 20 that one cable modem 500 is connected with 6 hosts which have a common Internet protocol (IP) address of 165.213.85.57 and have hardware addresses from 0000F0 111101 to 0000F0 111106, respectively, and the subnet is 255.255.255.248. In procedure ❶, one of the hosts 510 whose hardware address is 0000F0 111101 transmits an address resolution protocol (ARP) request frame 2002 in order to obtain a hardware address of 108.100.1.7 to the cable modem 500. In procedure ❷, the local IP address translation (LIAT) 706 of the cable modem 500 checks whether the target Internet protocol (IP) address of 108.100.1.7 corresponds to the local subnet. In this example, it is assumed that the target Internet protocol (IP) address does not correspond to the local subnet. Accordingly, information of the hardware address fields of an address resolution protocol (ARP) header and an Ethernet header in an ARP request frame 2002 shown in FIG. 20 is replaced with information of the hardware address of the host-1 (510-1) to form frame 2004, and then frame 2004 is transmitted to the remote access point 604 in procedure ❷.

In procedure ①, the local IP address translation (LIAT) 706 of the cable modem 500 receives the address resolution protocol (ARP) response frame 2006 from the cable modem termination process (CMTS) 110 in response to the address resolution protocol (ARP) request frame 2004, as shown in FIG. 20. In procedure ②, the local IP address translation (LIAT) 706 reads the hardware address of each of the hosts registered in the address resolution protocol (ARP) cache table 2000, and modifies information of the hardware address field of the address resolution protocol (ARP) header and the Ethernet header to become that of a format of the ARP response frame 2008-2010, and then transmits it to each of the hosts in sequence in procedure ③.

The FIG. 21 is a view illustrating message flows in a transmission control protocol/Internet protocol (TCP/IP) communication to the Internet network, in accordance with the principles of the present invention. In procedure ❶shown in FIG. 21, when the cable modem 500 receives an Internet protocol (IP) packet from the host 510, the modem 500 checks whether the destination Internet protocol (IP) address of the packet belongs to the local subnet network, before performing the hardware address port translation (HAPT) function ❷for the received Internet protocol (IP) packet. This checking operation is performed in such a manner that a logical AND operation is performed between the destination Internet protocol (IP) address and the subnet address stored in the local access point 600, and the operation result value is compared with the subnet address. If the result of the checking operation leads to a result value corresponding to the subnet address, it is determined to transmit the packet to the local subnet network.

However, FIG. 21 shows a situation where, as a result of the checking operation, the destination Internet protocol (IP) address does not belong to the local subnet network, and thus the corresponding Internet protocol (IP) packet is subject to the hardware address port translation (HAPT) operation ❷with HAPT table 2100 prior to transmission ❸to the cable modem termination process (CMTS) 110 through the remote access point 604. The FIG. 21 shows format 2108 corresponding to procedures ❶and ❷, shows format 2102 corresponding to procedure ❸, shows format 2104 corresponding to procedure ①, and shows format 2106 corresponding to procedure ③.

Figure 22:
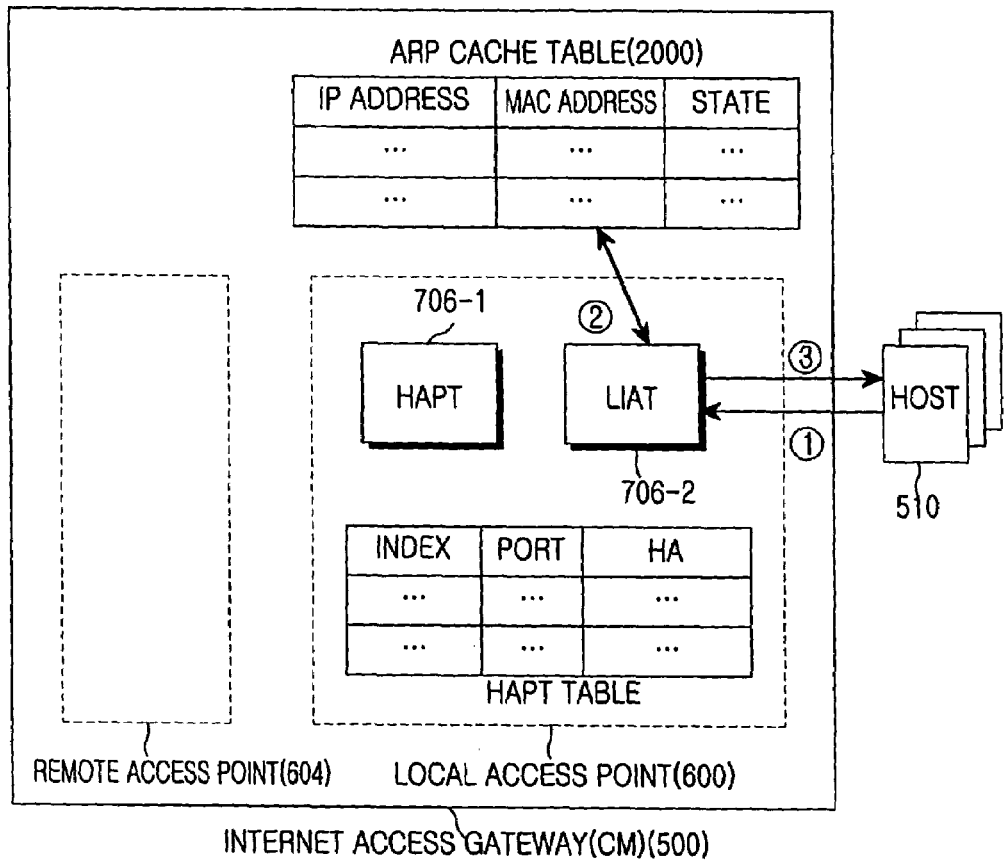
FIG. 22 is a view illustrating message flows in a transmission control protocol/Internet protocol (TCP/IP) communication between customer premises equipment (CPE) units, in accordance with the principles of the present invention.

FIG. 22 is a view illustrating message flows in a transmission control protocol/Internet protocol (TCP/IP) communication between customer premises equipment (CPE) units, in accordance with the principles of the present invention. Here, the customer premises equipment (CPE) units can be cable modems, for example.

The FIG. 22 shows inter-host communication with inter-host frames 2200 and 2202. The FIG. 22 shows a situation where the destination Internet protocol (IP) address received in format 2200 of procedure ① does belong to the local subnet network, and thus the source Internet protocol (IP) address is modified in procedure ② with reference to the address resolution protocol (ARP) cache table 2000 of the cable modem 500 and the destination Internet protocol (IP) address of the corresponding Internet protocol (IP) packet, and then the modified packet 2202 is transmitted in procedure ③ to the local subnet network connected to the cable modem 500. All the actual Internet protocol (IP) addresses of the cable modem 500 are the same as the public Internet protocol (IP) address allocated by the cable modem termination process (CMTS) 110. The cable modem 500 is customer premises equipment (CPE).

Accordingly, the destination Internet protocol (IP) address is modified to the public Internet protocol (IP) address allocated by the cable modem termination process (CMTS) 110. The Internet protocol (IP) address of a hardware address which is included in the address resolution protocol (ARP) cache table 2000 and corresponds to the source hardware address of the corresponding Internet protocol (IP) packet is modified to a source Internet protocol (IP) address, and then the Internet protocol (IP) packet is transmitted to the local subnet network.

Knowledge of the virtual Internet protocol (IP) addresses allocated to the hosts can be acquired through the following method. Although a virtual Internet protocol (IP) address is allocated to each of the hosts using the local IP address translation (LIAT) 706, each of the hosts is actually allocated the same Internet protocol (IP) address. Therefore, without referring to the address resolution protocol (ARP) table 2000 of the cable modem 500, it is difficult for a host to know a virtual Internet protocol (IP) address allocated to itself. This difficulty can be overcome by using the field of domain name service (DNS) servers among the optional fields of the dynamic host configuration protocol (DHCP) message.

Figure 23:
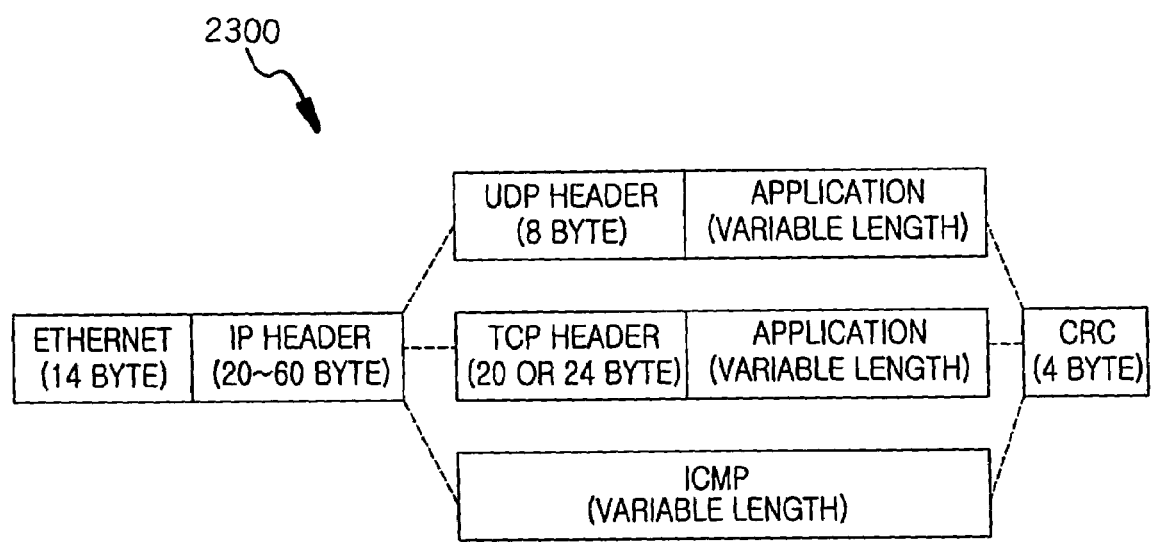
FIGS. 23 to 27 are views showing message formats, in accordance with the principles of the present invention.
Figure 24:
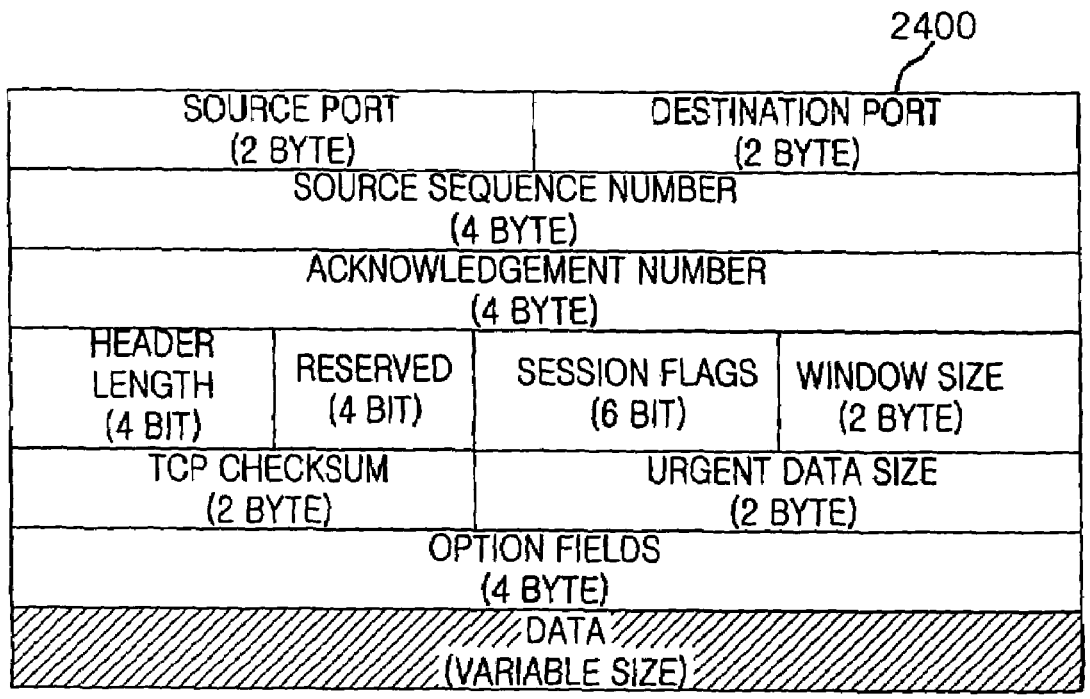

That is, when the dynamic host configuration protocol (DHCP) server spoofer 602 allocates an Internet protocol (IP) address to each of the hosts by using the DHCP ACK message, it adds a virtual Internet protocol (IP) address of the corresponding host, as a domain name service (DNS) server entry, to an end portion of the field of domain name service (DNS) servers. In order for each host to acquire the virtual Internet protocol (IP) address allocated to itself, a command input window is opened, and then a command "ipconfig/all" is inputted thereto so as to perform the corresponding procedure. Here, the last entry of the field of domain name service (DNS) servers corresponds to the virtual Internet protocol (IP) address of the corresponding host. FIG. 23 shows structure 2300, FIG. 24 shows structure 2400, FIG. 25 shows structure 2500, FIG. 26 shows structure 2600, and FIG. 27 shows structure 2700.

As apparent from the above description, the present invention can overcome the depletion of public Internet protocol (IP) addresses by allowing a plurality of hosts to gain access to the Internet while the hosts share a single Internet protocol (IP) address. In addition, the present invention allows a plurality of hosts to share a single Internet protocol (IP) address without using the network address translation (NAT), thereby overcoming problems caused by using the network address translation.

While the present invention has been illustrated by the description of embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departing from the spirit and scope of the applicant's general inventive concept.

What is claimed is:

1. An apparatus allocating addresses, the apparatus comprising:
a network device being connected to a service provider and being connected to at least two hosts, the at least two hosts including a first host, the service provider allocating a first protocol address to the first host, the first protocol address being included in frames sent from each one of the at least two hosts, said network device comprising:
a first module receiving frames from the hosts, modifying source medium access control addresses and port numbers of the frames received from the hosts, and forwarding the frames having the modified source addresses and port numbers to the service provider;
said first module storing the modified source medium access control addresses and port numbers in a first table;
said first module receiving frames from the service provider, accessing the first table, modifying destination medium access control addresses and port numbers of the frames received from the service provider in dependence upon the addresses and port numbers stored in the first table, and forwarding the frames having the modified destination addresses and port numbers to the hosts corresponding to the modified destination addresses and port numbers; and
a server spoofer transmitting and assigning the first protocol address to all of the hosts other than the first host.

2. The apparatus of claim 1, said network device further comprising a client being allocated a second protocol address by the service provider through a dynamic host configuration protocol message communication.

3. The apparatus of claim 1, the first protocol address corresponding to a source Internet protocol address in frames sent from every one of the at least two hosts to the service provider for access to the Internet.

4. The apparatus of claim 3, said network device further comprising a second module modifying protocol addresses in inter-host frames, the inter-host frames being frames sent from one of the at least two hosts to another one of the at least two hosts.

5. The apparatus of claim 4, said first module not modifying the destination medium access control addresses and port numbers of the frames received from the service provider when the frames received from the service provider are frames selected from among broadcast frames and multicast frames.

6. The apparatus of claim 5, said network device further comprising a client being allocated a second protocol address by the service provider through a dynamic host configuration protocol message communication.

7. The apparatus of claim 6, the protocol addresses corresponding to Internet protocol addresses, the client corresponding to a dynamic host configuration protocol client, the service provider including a dynamic host configuration protocol server performing the allocation of the first and second Internet protocol addresses, said first module and the first table corresponding to a hardware address port translation module and a hardware address port translation table, respectively.

8. The apparatus of claim 1, said first module not modifying the destination medium access control addresses and port numbers of the frames received from the service provider when the frames received from the service provider are frames selected from among broadcast frames and multicast frames.

9. The apparatus of claim 1, said network device further comprising a second module, said second module registering a plurality of protocol addresses in a second table, each one of the plurality of protocol addresses corresponding respectively to one medium access control address of one of the hosts;

when said second module receives an inter-host frame having a first source protocol address and a first destination protocol address, said second module accessing the second table, modifying the inter-host frame by replacing the first source and destination protocol addresses of the inter-host frame in dependence upon the addresses registered in the second table, and forwarding the modified inter-host frame to the host corresponding to the first destination protocol address, the inter-host frame being a frame sent from one of the at least two hosts to another one of the at least two hosts.

10. The apparatus of claim 9, each one of the plurality of protocol addresses being in a same subnet, the plurality of protocol addresses including the first protocol address, the first and second tables being included in said network device.

11. A method for allocating Internet protocol addresses in a local network, the method comprising:

allocating a first Internet protocol address to an Internet access gateway when the Internet access gateway is booted;

requesting a second Internet protocol address, said requesting being performed by a first host selected from among at least two hosts connected to the Internet access gateway;

allocating the second Internet protocol address to the first host in response to said requesting, the local network including the Internet access gateway connected to an Internet service provider and to the at least two hosts, each of the at least two hosts using the second Internet protocol address to access the Internet through the Internet service provider;

said allocating of the second protocol address to the first host and said allocating of the first Internet protocol address being performed by a dynamic host configuration protocol server included in the Internet service provider;

capturing network configuration information including the second Internet protocol address, the network configuration information being transmitted from the dynamic host configuration protocol server to the first host when the second Internet protocol address is allocated to the first host;

storing the captured information in a dynamic host configuration protocol server spoofer included in the Internet access gateway; and allocating the second Internet protocol address to the hosts other than the first host.

12. The method of claim 11, said allocating of the second Internet protocol address to the hosts other than the first host being performed by the dynamic host configuration protocol server spoofer, in dependence upon the network configuration information stored in the dynamic host configuration protocol server spoofer, said allocating of the second Internet protocol address to the hosts other than the first host being performed in response to Internet protocol allocation requests from the hosts other than the first host.

13. The method of claim 11, further comprising:

receiving frames from the hosts;

modifying source medium access control addresses and port numbers of the frames received from the hosts;

forwarding the frames having the modified source addresses and port numbers to the service provider;

storing the modified source medium access control addresses and port numbers in a first table;

receiving frames from the service provider;

accessing the first table;

modifying destination medium access control addresses and port numbers of the frames received from the service provider in dependence upon the addresses and port numbers stored in the first table;

forwarding the frames having the modified destination addresses and port numbers to the hosts corresponding to the modified destination addresses and port numbers;

registering a plurality of protocol addresses in a second table, each one of the plurality of protocol addresses corresponding respectively to one medium access control address of one of the hosts, the plurality of protocol addresses including the second protocol address and not including the first protocol address, each one of the plurality of protocol addresses being in a same subnet;

receiving an inter-host frame having a first source address and a first destination address;

accessing the second table;

modifying the inter-host frame by replacing the first source and destination protocol addresses of the inter-host frame in dependence upon the addresses registered in the second table; and forwarding the modified inter-host frame to the host corresponding to the first destination protocol address, the inter-host frame being a frame sent from one of the at least two hosts to another one of the at least two hosts.

14. The method of claim 13, said modifying of the destination medium access control addresses and port numbers being not performed when the frames received from the service provider are frames selected from among broadcast frames and multicast frames.

15. A method of allocating addresses, the method comprising:

allocating a first protocol address to a first host selected from among at least two hosts in a network, the at least two hosts being connected to a network device, the network device being connected to a service provider, said allocating of the first protocol address being performed by the service provider, the first protocol address corresponding to a source Internet protocol address in frames sent from every one of the at least two hosts to the service provider for access to the Internet;

transmitting and assigning the first protocol address to all of the hosts other than the first host;

receiving frames from the hosts;

modifying source medium access control addresses and port numbers of the frames received from the hosts;

forwarding the frames having the modified source addresses and port numbers to the service provider;

storing the modified source medium access control addresses and port numbers in a first table;

receiving frames from the service provider;

accessing the first table;

modifying destination medium access control addresses and port numbers of the frames received from the service provider in dependence upon the addresses and port numbers stored in the first table; and forwarding the frames having the modified destination addresses and port numbers to the hosts corresponding to the modified destination addresses and port numbers.

16. The method of claim 15, further comprising modifying protocol addresses in inter-host frames, the inter-host frames being frames sent from one of the at least two hosts to another one of the at least two hosts.

17. The method of claim 16, said modifying of the destination medium access control addresses and port numbers being not performed when the frames received from the service provider are frames selected from among broadcast frames and multicast frames.

18. The method of claim 15, further comprising:
registering a plurality of protocol addresses in a second table, each one of the plurality of protocol addresses corresponding respectively to one medium access control address of one of the hosts;
receiving an inter-host frame having a first source address and a first destination address;
accessing the second table;
modifying the inter-host frame by replacing the first source and destination protocol addresses of the inter-host frame in dependence upon the addresses registered in the second table; and
forwarding the modified inter-host frame to the host corresponding to the first destination protocol address, the inter-host frame being a frame sent from one of the at least two hosts to another one of the at least two hosts.

19. The method of claim 18, each one of the plurality of protocol addresses being in a same subnet, the plurality of protocol addresses including the first protocol address.

20. The method of claim 19, further comprising allocating a second Internet protocol address to the network device when the network device is booted, said allocating of the second Internet protocol address being performed by the service provider, said transmitting and assigning of the first protocol address to all of the hosts other than the first host being performed by a server spoofer included in the network device.

* * * * *